United States Patent
Kocienda et al.

(10) Patent No.: US 9,900,518 B2
(45) Date of Patent: Feb. 20, 2018

(54) MULTIFUNCTION PHYSICAL BUTTON

(71) Applicant: Apple Inc., Cupertino, CA (US)

(72) Inventors: Kenneth Kocienda, San Jose, CA (US); Imran Chaudhri, San Francisco, CA (US); Daniel Max Strongwater, San Francisco, CA (US); Kristi E. S. Bauerly, Sunnyvale, CA (US); Roberto G. Yepez, San Francisco, CA (US); Justin S. Titi, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/869,807

(22) Filed: Sep. 29, 2015

(65) Prior Publication Data

US 2016/0373631 A1   Dec. 22, 2016

Related U.S. Application Data

(60) Provisional application No. 62/182,486, filed on Jun. 20, 2015.

(51) Int. Cl.
*H04N 5/232* (2006.01)

(52) U.S. Cl.
CPC ......... *H04N 5/23293* (2013.01); *H04N 5/232* (2013.01); *H04N 5/23216* (2013.01); *H04N 5/23241* (2013.01); *H04N 5/23258* (2013.01)

(58) Field of Classification Search
CPC .......... H04N 5/23293; H04N 5/23216; H04N 5/23241; H04N 5/23258; G06F 3/017
See application file for complete search history.

(56) References Cited

U.S. PATENT DOCUMENTS

| | | | | |
|---|---|---|---|---|
| 2004/0189861 A1* | 9/2004 | Tom | ................. | H04N 1/00307 348/375 |
| 2005/0237383 A1* | 10/2005 | Soga | ..................... | H04N 5/232 348/36 |
| 2012/0057064 A1* | 3/2012 | Gardiner | ............... | G06F 1/1626 348/333.12 |
| 2013/0009858 A1* | 1/2013 | Lacey | ................... | G06F 1/1643 345/156 |
| 2014/0099994 A1* | 4/2014 | Bishop | ................. | H04N 5/2252 455/556.1 |

OTHER PUBLICATIONS https://manuals.info.apple.com/MANUALS/1000/MA1539/en_US/iPhone_iOS4_User_Guide.pdf, 2011.*

* cited by examiner

*Primary Examiner* — Ahmed A Berhan
(74) *Attorney, Agent, or Firm* — Dentons US LLP

(57) ABSTRACT

The present disclosure generally relates to multifunction physical buttons. An electronic device detects activation of a physical button. The device determines whether a set of one or more criteria are met. If the set of one or more criteria are met, the device captures an image using an image sensor. If the set of one or more criteria are not met, the device turns off the display of the device. Thus, the same physical button can perform different functions based on whether the set of one or more criteria are met.

57 Claims, 17 Drawing Sheets

MULTIFUNCTION PHYSICAL BUTTON

CROSS-REFERENCE TO RELATED APPLICATIONS

This application claims priority from U.S. Provisional Ser. No. 62/182,486, entitled "MULTIFUNCTION PHYSICAL BUTTON," filed Jun. 20, 2015, which is hereby incorporated by reference in its entirety for all purposes.

FIELD

The present disclosure relates generally to computer user interfaces, and more specifically to techniques for managing a multifunction physical button.

BACKGROUND

Depressing a physical button of a device frequently causes the device to perform a specific task. For example, a power button of a device is used to power the device on and off. For another example, a shutter-release button of a device is used to take a picture. When a user inadvertently presses one button of the device when the user intended to press a different button, the device performs a task that the user does not intend. Additionally, the device does not perform the task that the user did intend.

BRIEF SUMMARY

A multifunction physical button can be configured to perform various functions. Some techniques for managing multifunction physical buttons using electronic devices are generally cumbersome and inefficient. For example, some existing techniques use a complex and time-consuming user interface, which may include multiple key presses or keystrokes. Existing techniques are inaccurate and require more time than necessary, wasting user time and device energy. This latter consideration is particularly important in battery-operated devices.

In some circumstances, while a camera application is active on a device, a user unintentionally activates a device's power button that is associated with turning off the device's display or turning off the device (e.g., either a multifunction button or a dedicated power button). As a result, the user misses out on the ephemeral opportunity to take a picture. In other circumstances, while a camera application is active on a device, the user intends to press a dedicated shutter-release button (e.g., a second physical button) to take a picture, but instead unintentionally presses a button (e.g., a physical button) that is not dedicated to just shutter release, thereby causing the device to perform an unintended function other than to take the picture. In other circumstances, the user unintentionally press (either simultaneously or near-simultaneously) a dedicated shutter-release button and a power button associated with turning the device's display or device off. If the power button is near-simultaneously activated before the shutter-release button, the device does not capture the image and the user misses out on the ephemeral opportunity to take the picture. If the power button is near-simultaneously activated after the shutter-release button, the user is not able to quickly take additional pictures. The present techniques reduce or eliminate unintentional display/device power off while taking a picture.

Accordingly, the present technique provides electronic devices with faster, more efficient methods and interfaces for managing multifunction physical buttons. Such methods and interfaces optionally complement or replace other methods for managing multifunction physical buttons. Such methods and interfaces reduce the cognitive burden on a user and produce a more efficient human-machine interface. For battery-operated computing devices, such methods and interfaces conserve power and increase the time between battery charges. Such methods and interfaces also prevent the device from performing unintended or unnecessary tasks, thereby reducing processing power usage, reducing memory usage, and reducing battery usage.

In accordance with some embodiments, a method is performed at an electronic device with a display, a physical button, and an image sensor. The method includes: detecting, while the display is on, activation of the physical button; and in response to detecting activation of the physical button: determining whether a set of one or more criteria is met; in accordance with a determination that the set of one or more criteria is met, capturing an image using the image sensor; and in accordance with a determination that the set of one or more criteria is not met, turning the display off.

In accordance with some embodiments, a non-transitory computer-readable storage medium comprising one or more programs for execution by one or more processors of an electronic device with a display, a physical button, and an image sensor is described. The one or more programs including instructions which, when executed by the one or more processors, cause the electronic device to: detect, while the display is on, activation of the physical button; and in response to detecting activation of the physical button: determine whether a set of one or more criteria is met; in accordance with a determination that the set of one or more criteria is met, capture an image using the image sensor; and in accordance with a determination that the set of one or more criteria is not met, turn the display off.

In accordance with some embodiments, a transitory computer-readable storage medium comprising one or more programs for execution by one or more processors of an electronic device with a display, a physical button, and an image sensor is described. The one or more programs including instructions which, when executed by the one or more processors, cause the electronic device to: detect, while the display is on, activation of the physical button; and in response to detecting activation of the physical button: determine whether a set of one or more criteria is met; in accordance with a determination that the set of one or more criteria is met, capture an image using the image sensor; and in accordance with a determination that the set of one or more criteria is not met, turn the display off.

In accordance with some embodiments, an electronic device comprises a display; a physical button; an image sensor; one or more processors; memory; and one or more programs stored in memory, including instructions which, when executed by the one or more processors, cause the electronic device to: detect, while the display is on, activation of the physical button; and in response to detecting activation of the physical button: determine whether a set of one or more criteria is met; in accordance with a determination that the set of one or more criteria is met, capture an image using the image sensor; and in accordance with a determination that the set of one or more criteria is not met, turn the display off.

In accordance with some embodiments, a device comprises a display; a physical button; an image sensor; means for detecting, while the display is on, activation of the physical button; and means, responsive to detecting activation of the physical button, for: determining whether a set of one or more criteria is met; in accordance with a determination that the set of one or more criteria is met, capturing an image using the image sensor; and in accordance with a determination that the set of one or more criteria is not met, turning the display off.

In accordance with some embodiments, an electronic device comprises: a display unit; a physical button unit; an image sensor unit; and a processing unit coupled to the display unit, the physical button unit, and the image sensor unit, the processing unit configured to: detect, while the display unit is on, activation of the physical button unit; and in response to detecting activation of the physical button unit: determine whether a set of one or more criteria is met; in accordance with a determination that the set of one or more criteria is met, capture an image using the image sensor unit; and in accordance with a determination that the set of one or more criteria is not met, turn the display unit off.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing multifunction physical buttons, thereby increasing the effectiveness, efficiency, and user satisfaction with such devices. Such methods and interfaces may complement or replace other methods for managing multifunction physical buttons.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing multifunction physical buttons. For example, some techniques changing the function of a single physical button between causing the device to capture an image and causing the display of the device to turn off. For another example, some techniques manage changing the function of a single physical button between causing the device to capture an image and causing the device to lock. Such techniques can reduce the cognitive burden on a user who use the physical button, thereby enhancing productivity. Further, such techniques can reduce processor and battery power otherwise wasted on redundant user inputs. For example, additional processing power and batter power are used when a user re-attempts to capture an image when a first attempt to capture the image causes the display of the device to turn off.

Figure 7:
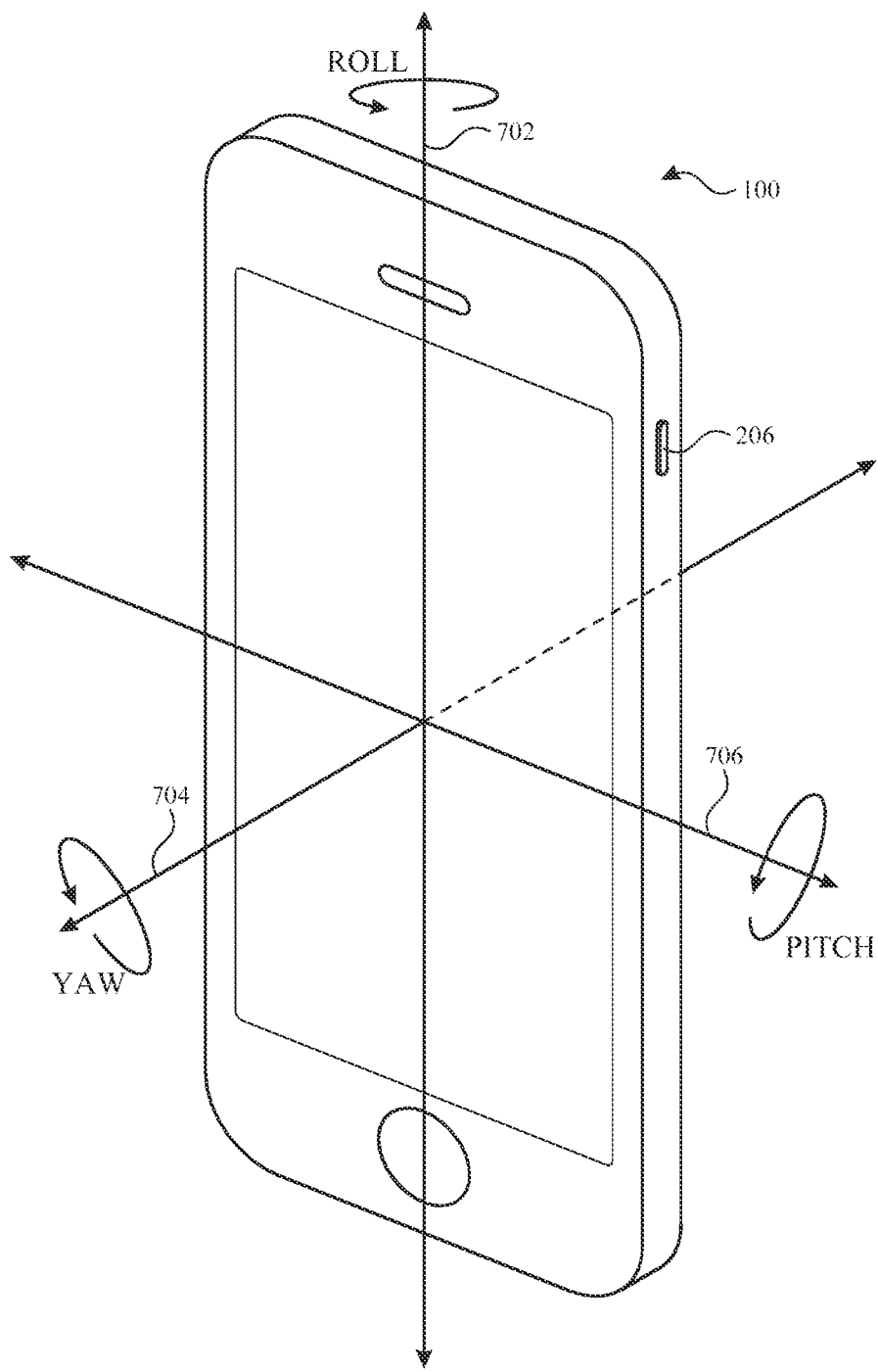
FIG. 7 illustrates exemplary axes of rotation for an electronic device in accordance with some embodiments.
Figure 8:
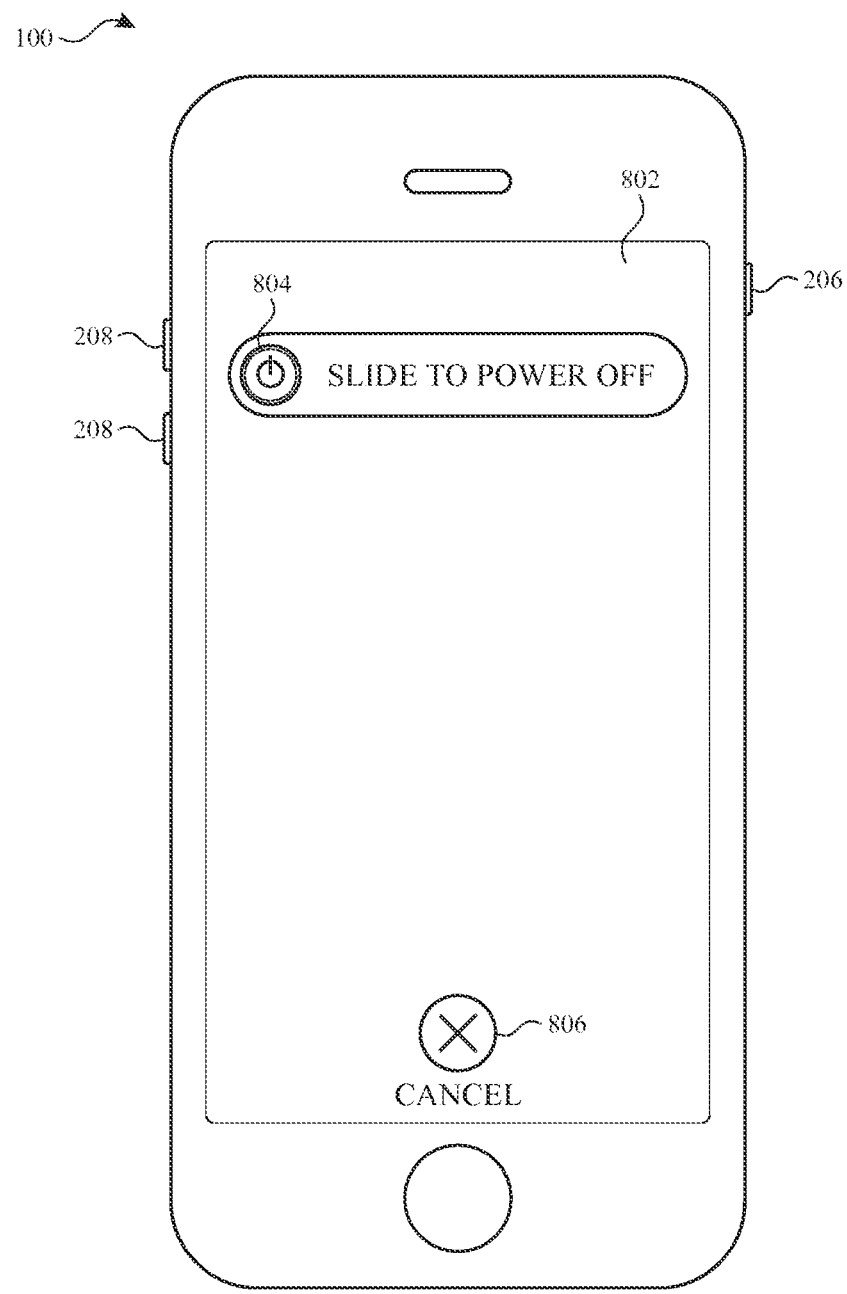
FIG. 8 illustrates an exemplary user interface for turning an electronic device off in accordance with some embodiments.
Figure 9:
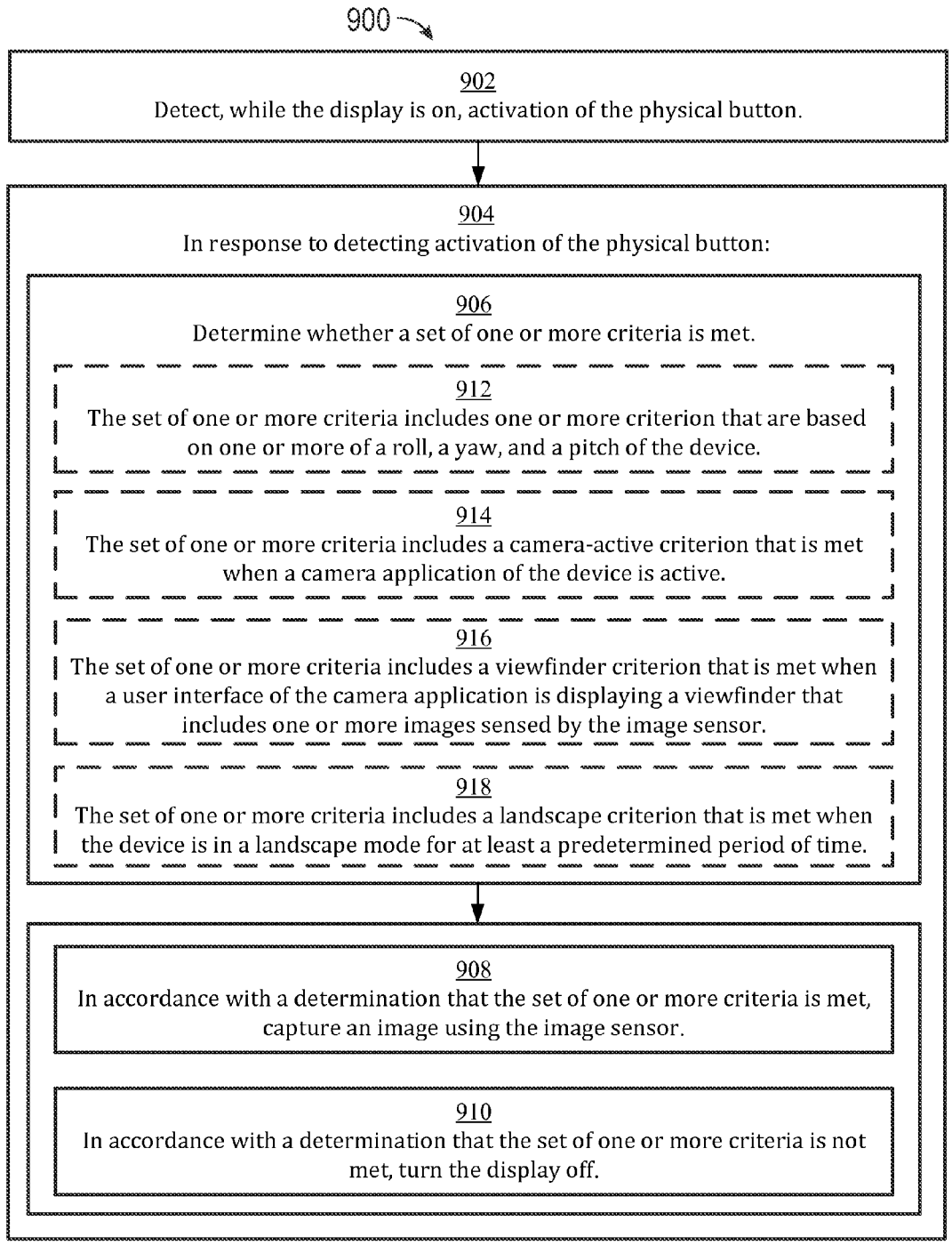
FIG. 9 is a flow diagram illustrating a method for managing a multifunction physical button using an electronic device in accordance with some embodiments.

Below, FIGS. 1A-1B, 2, 3, 4A-4B, and 5A-5B provide a description of exemplary devices for performing the techniques for managing event notifications. FIGS. 6A-6E illustrate exemplary user interfaces and techniques for managing a multifunction physical button in accordance with some embodiments. FIG. 7 illustrates exemplary axes of rotation for an electronic device in accordance with some embodiments. FIG. 8 illustrates an exemplary user interface for turning an electronic device off in accordance with some embodiments. FIG. 9 is a flow diagram illustrating methods of managing a multifunction physical button in accordance with some embodiments. The user interfaces in FIGS. 6A-6E and FIG. 8 and the techniques of FIG. 7 are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
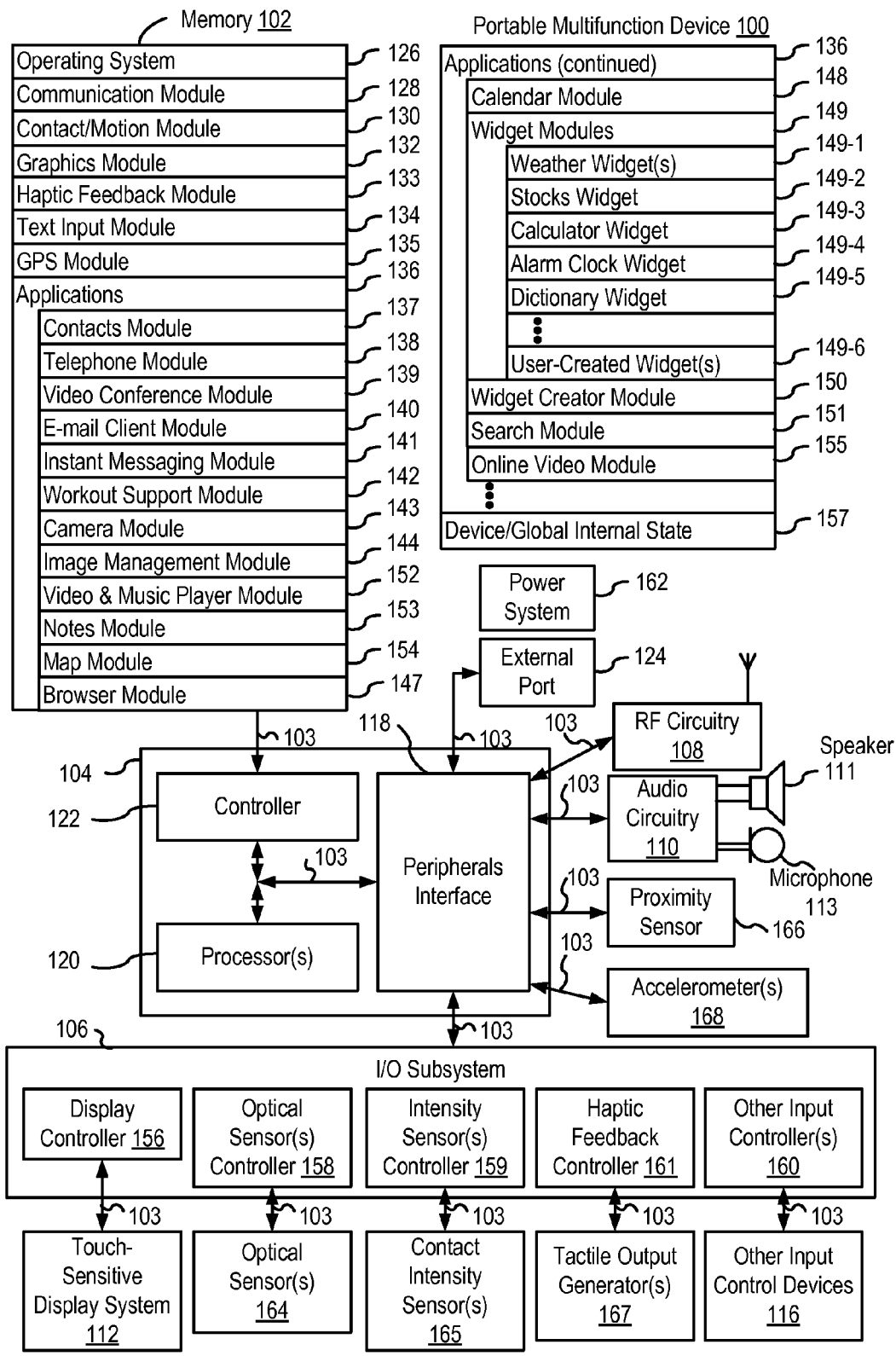
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
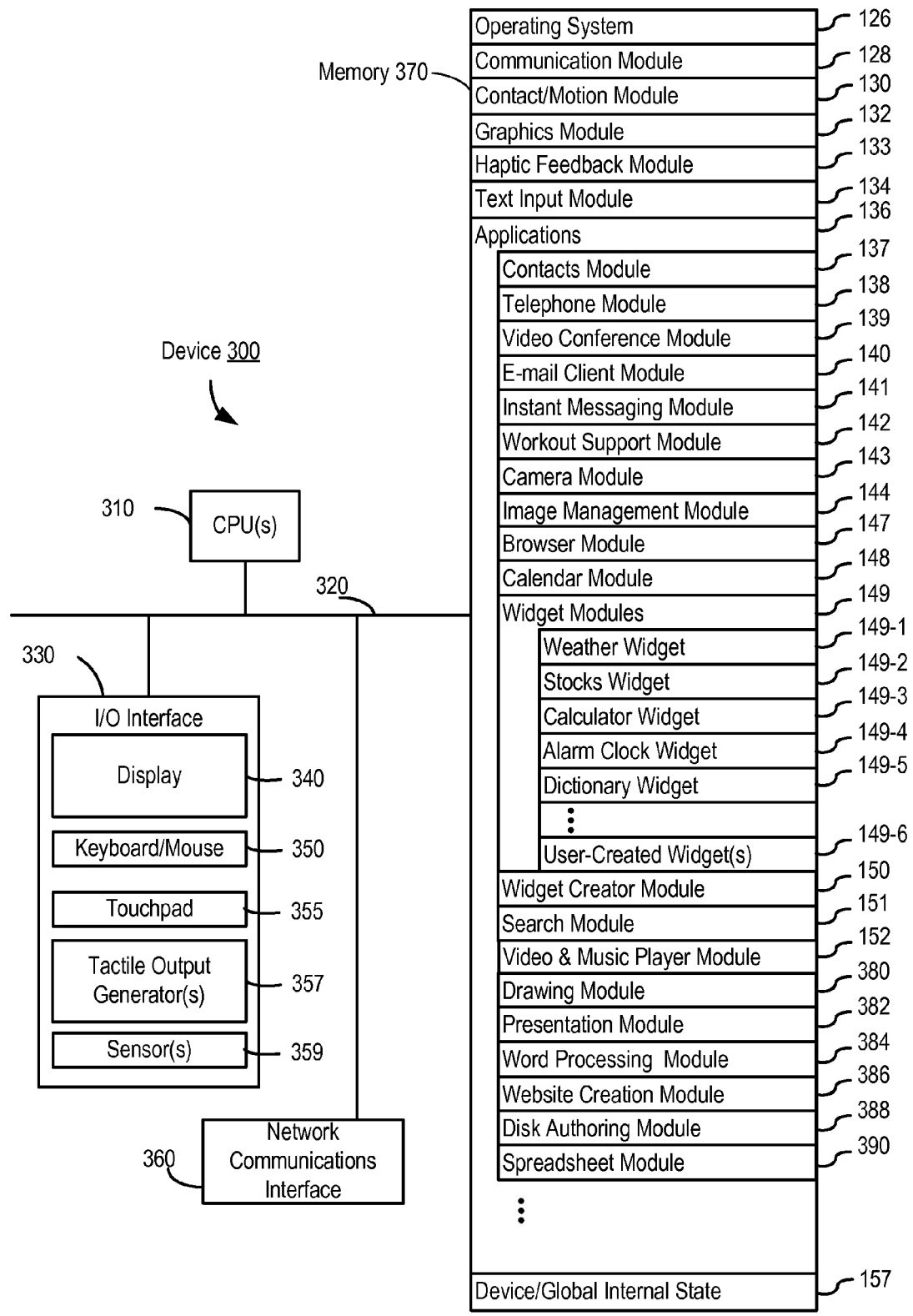
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
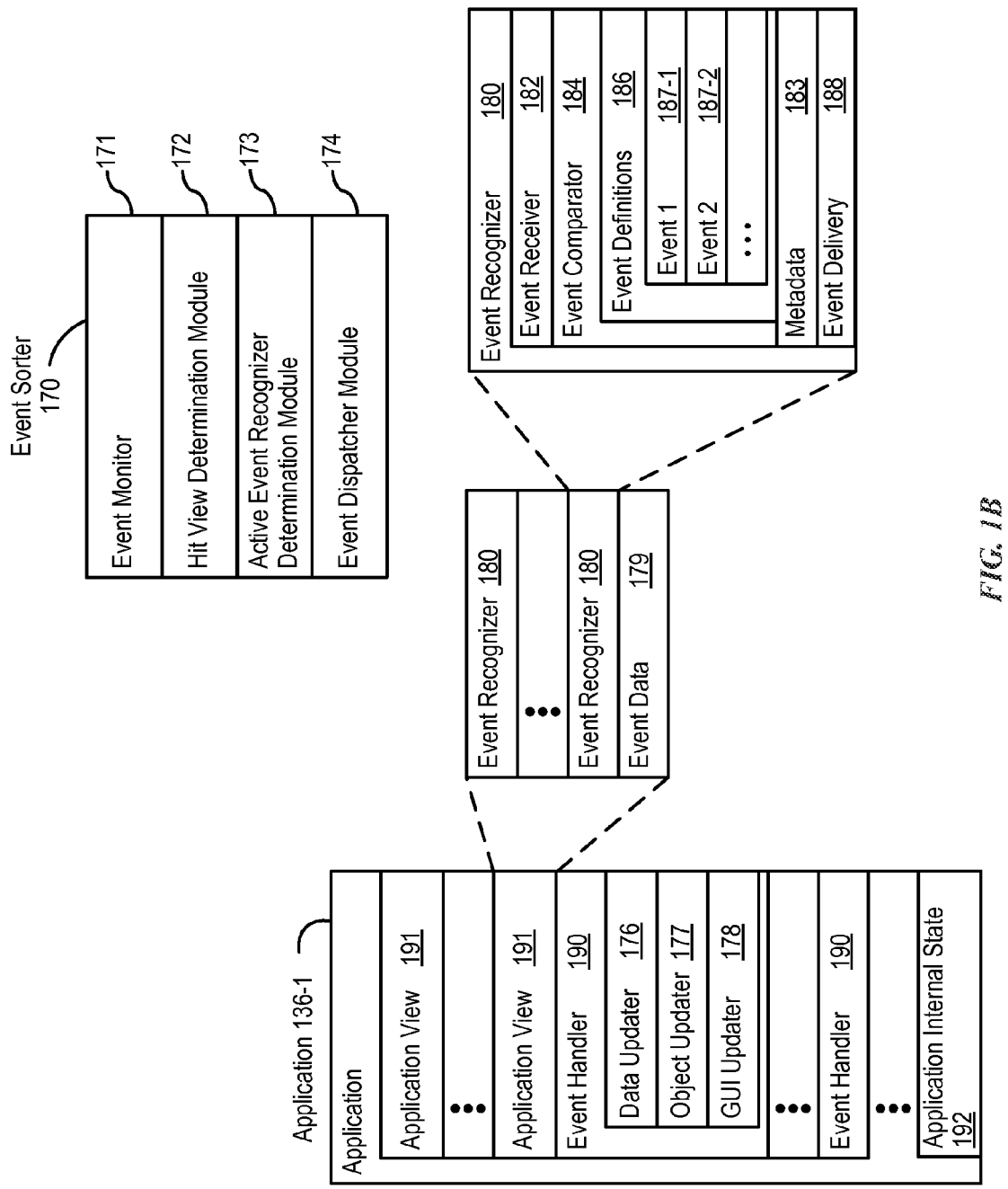
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
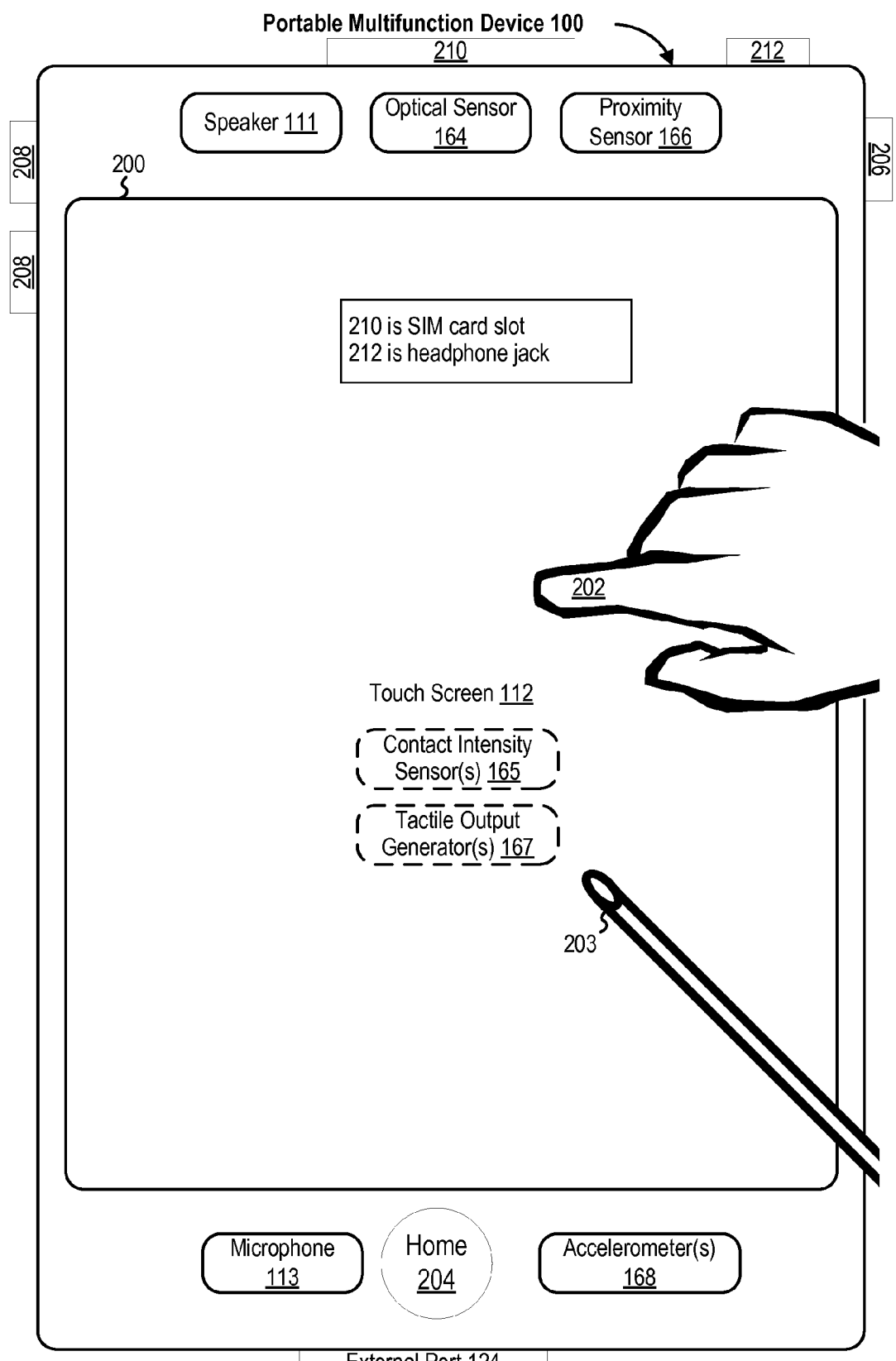
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
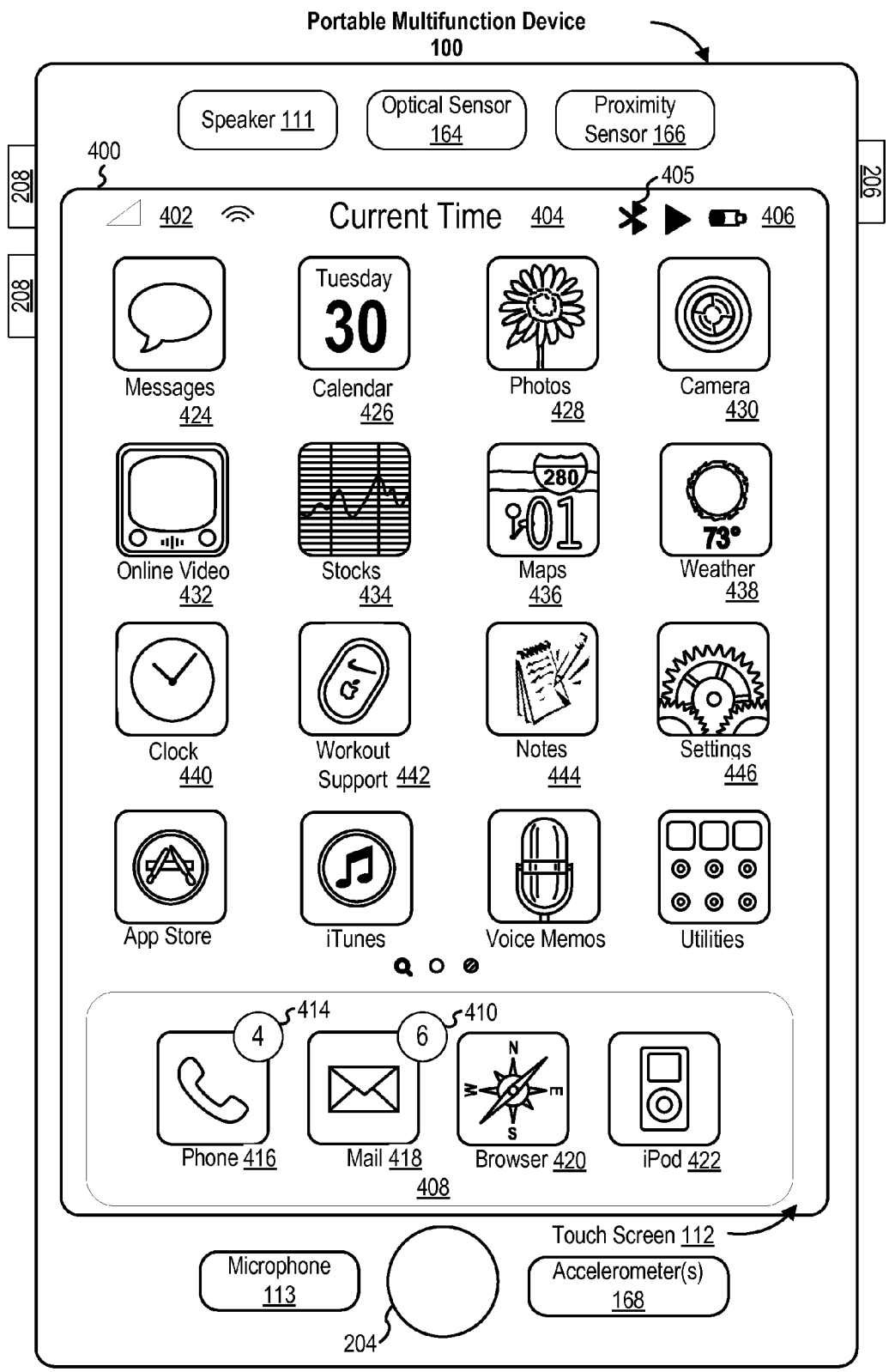
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
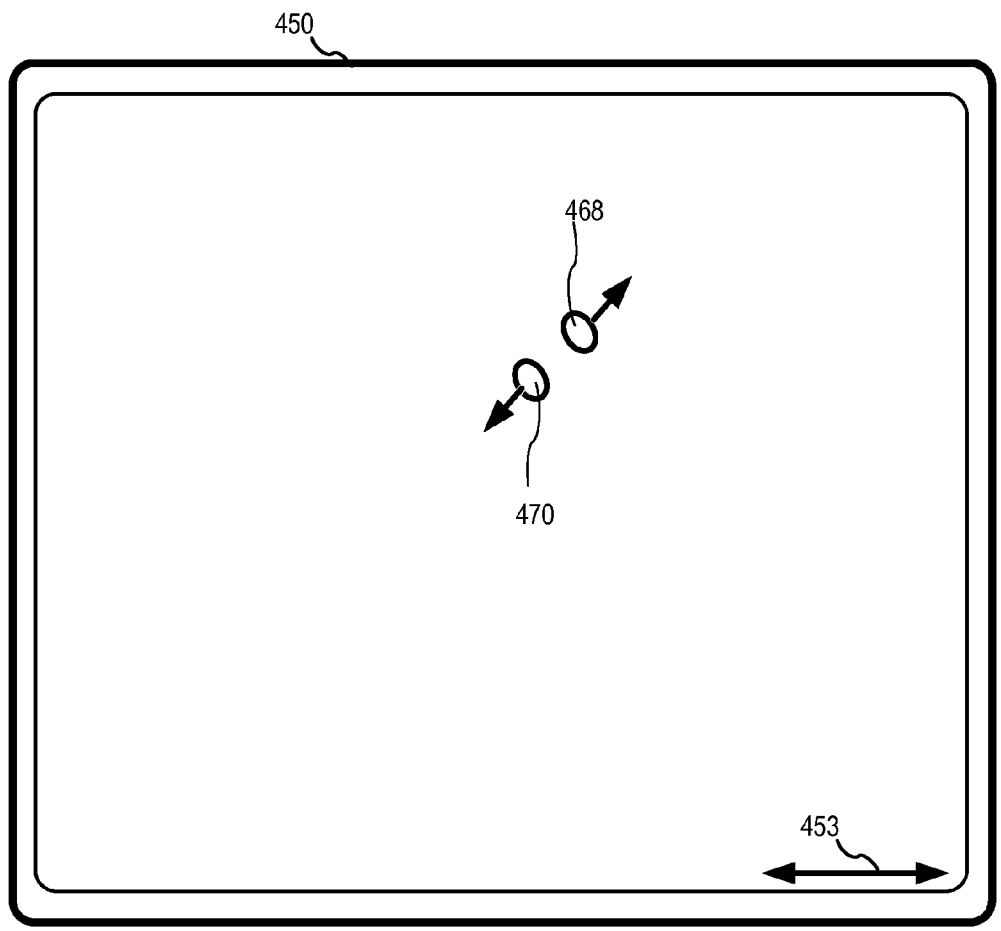
FIG. 4B illustrates an exemplary user interface for a multifunction device with a touch-sensitive surface that is separate from the display in accordance with some embodiments.
Figure 4B:
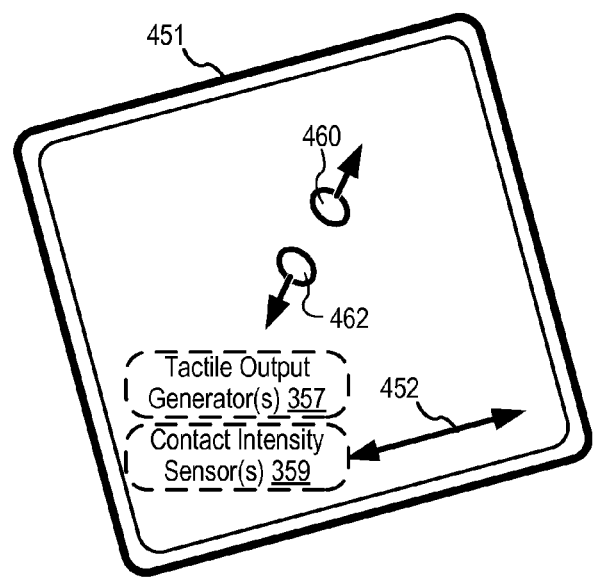

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
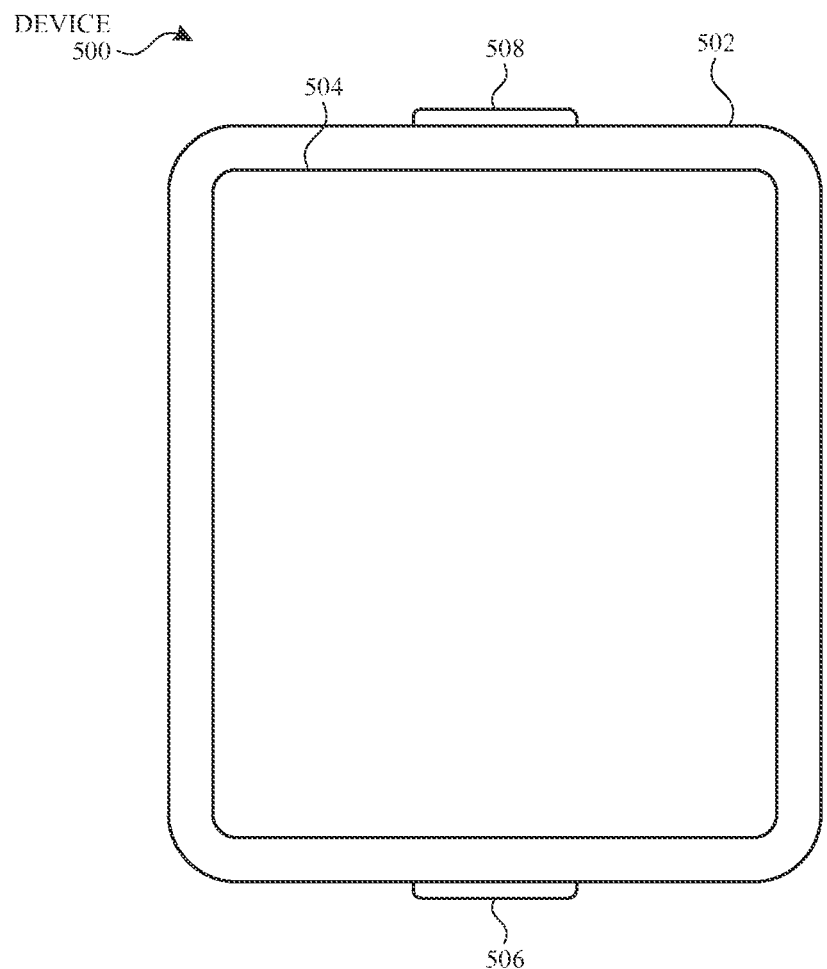
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
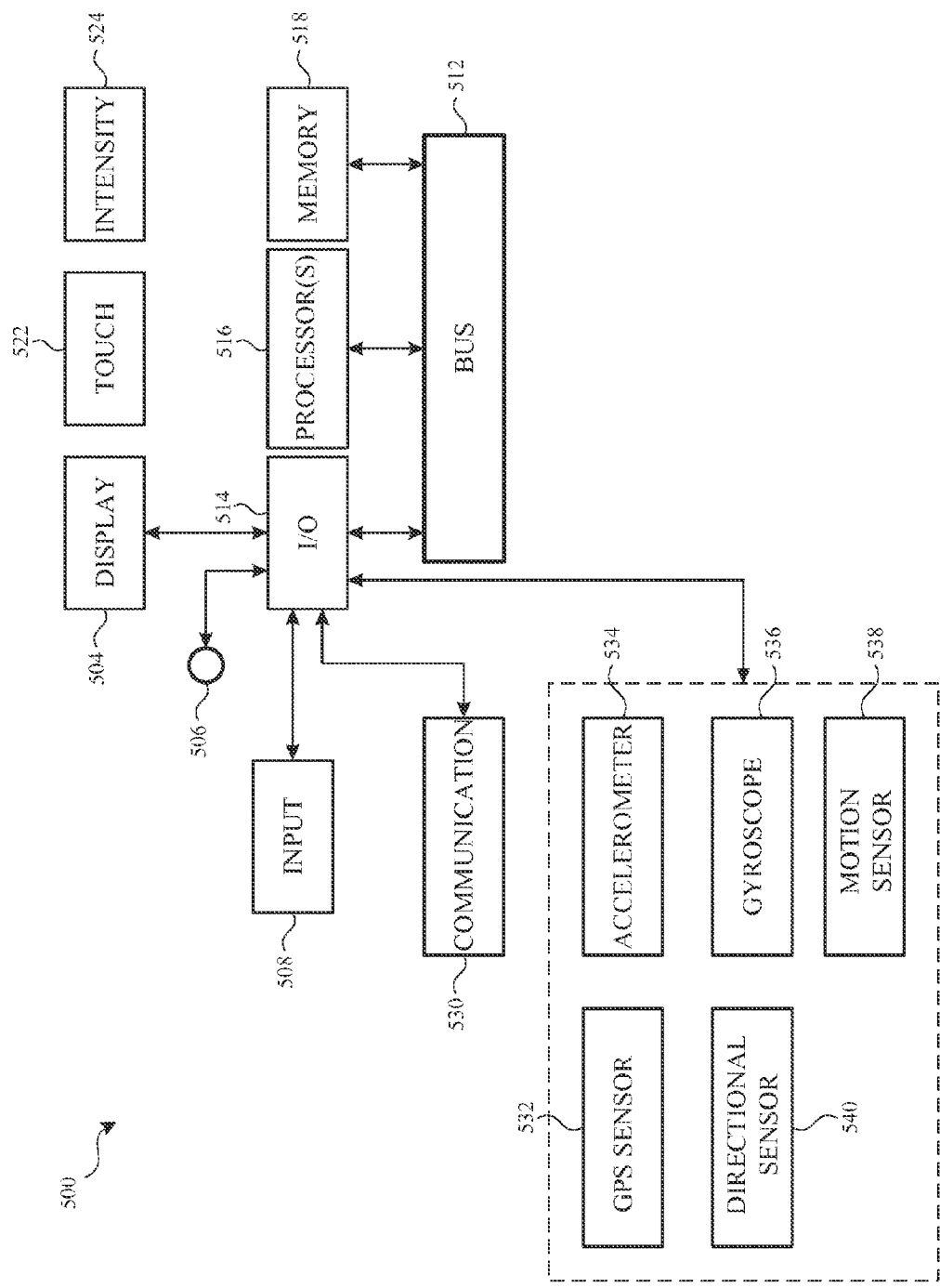
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including process 900 (FIG. 9). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, the term "open application" or "executing application" refers to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

Attention is now directed towards embodiments of user interfaces ("UI") and associated processes that are implemented on an electronic device, such as portable multifunction device 100, device 300, or device 500.

FIGS. 6A-6E illustrate exemplary user interfaces and techniques for managing a multifunction physical button, in accordance with some embodiments. The user interfaces and associated processes are implemented on an electronic device with a display, a physical button (e.g., a multifunction button), and an image sensor (e.g., optical sensor 164; a CCD sensor, a CMOS sensor). The user interfaces in these figures are used to illustrate the processes described below, including the processes in FIG. 9.

The device detects, while the display is on, activation of the physical button (e.g., a mechanical button or a capacitive button). In some embodiments, as described in further detail below, detecting activation of the physical button includes detecting one or more of various interactions with the physical button (e.g., 206). For example, the device detects activation of the physical button (e.g., 206) when a user depresses the physical button (e.g., 206).

In response to detecting activation of the physical button (e.g., 206), the device determines whether a set of one or more criteria is met. In response to detecting activation of the physical button and in accordance with a determination that the set of one or more criteria is met, the device captures an image using the image sensor (e.g., storing the image on a memory of the electronic device). In response to detecting activation of the physical button and in accordance with a determination that the set of one or more criteria is not met, the device turns the display off.

Figure 6A:
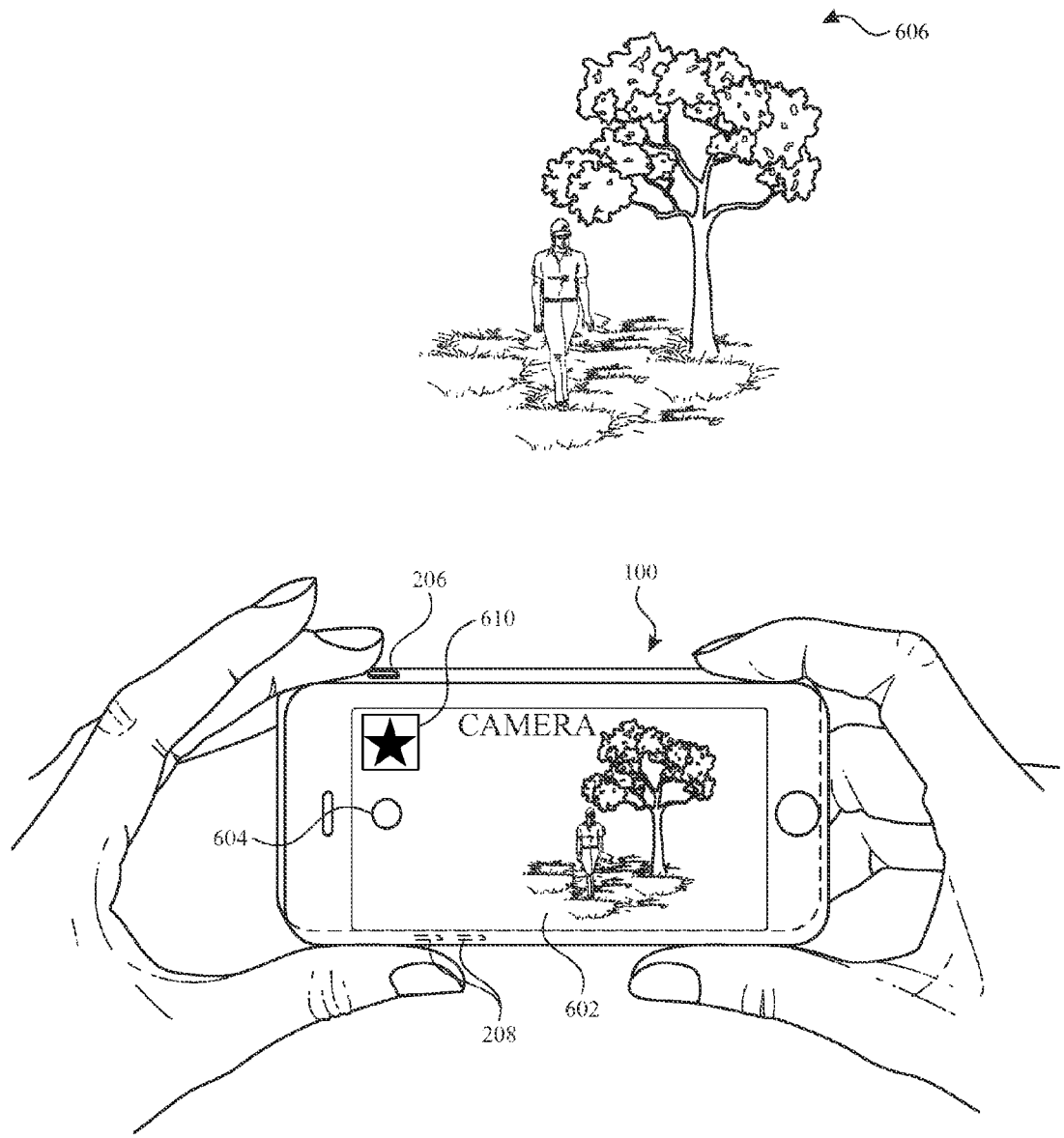
FIGS. 6A-6E illustrate exemplary user interfaces and techniques for managing a multifunction physical button in accordance with some embodiments.
Figure 6B:
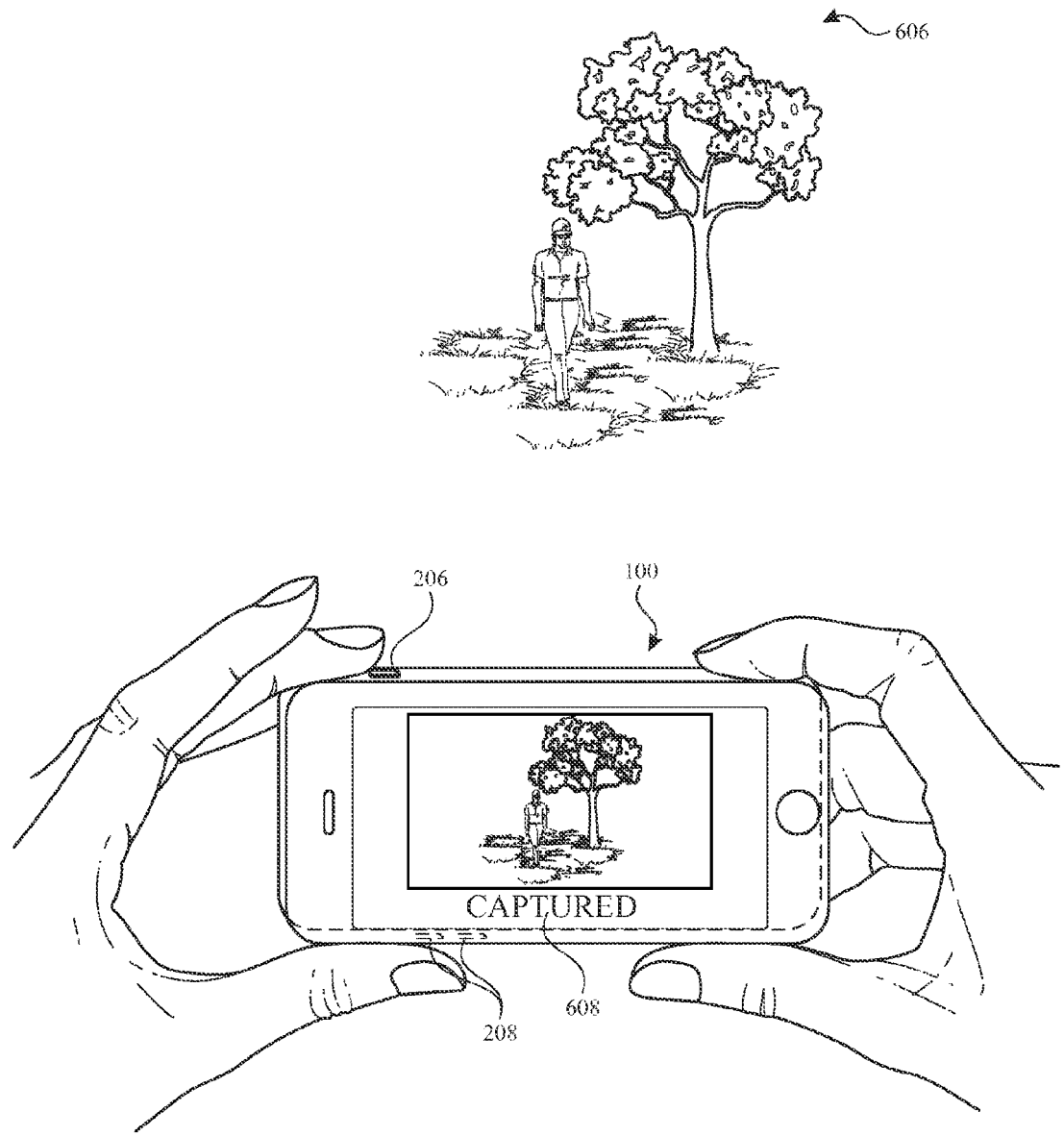

FIGS. 6A-6B illustrate an exemplary technique for capturing an image of a scene 606. In this example, as illustrated in FIG. 6A, the display of the device 100 is on (e.g., the display is actively displaying content) and a camera application (e.g., a digital camera application, a digital video camera application) is active. The user interface of the camera application is displaying a viewfinder 602 that includes one or more images of the scene 606 sensed by the image sensor.

The device detects, while the display is on, activation of the physical button (e.g., 206; a mechanical button or a capacitive button). In response to detecting activation of the physical button (e.g., 206), the device determines whether a set of one or more criteria is met. In this example, the set of one or more criteria include (1) a criterion that is met when the camera application is active and (2) a criterion that is met when the device is in landscape mode with the physical button on top. In FIG. 6A, for example, (1) the camera application of the device is active and (2) the device is in landscape mode with the physical button (e.g., 206) on top. Thus, the device 100 in FIG. 6A determines that the set of one or more criteria is met.

In response to detecting activation of the physical button (e.g., 206) and in accordance with a determination that the set of one or more criteria is met, the device captures an image (e.g., stores the image on a memory of the electronic device) using the image sensor, as indicated in FIG. 6B.

In FIG. 6B, the device indicates that the image has been captured. In some embodiments, the user interface of the camera application indicates that an image has been captured. For example, the indication is a visual indication 608 displayed on the display as part of the user interface of the camera application. In some examples, the visual indication is an animation of a shutter closing and opening. In some examples, the visual indication is a display of the captured image 608.

Figure 6C:
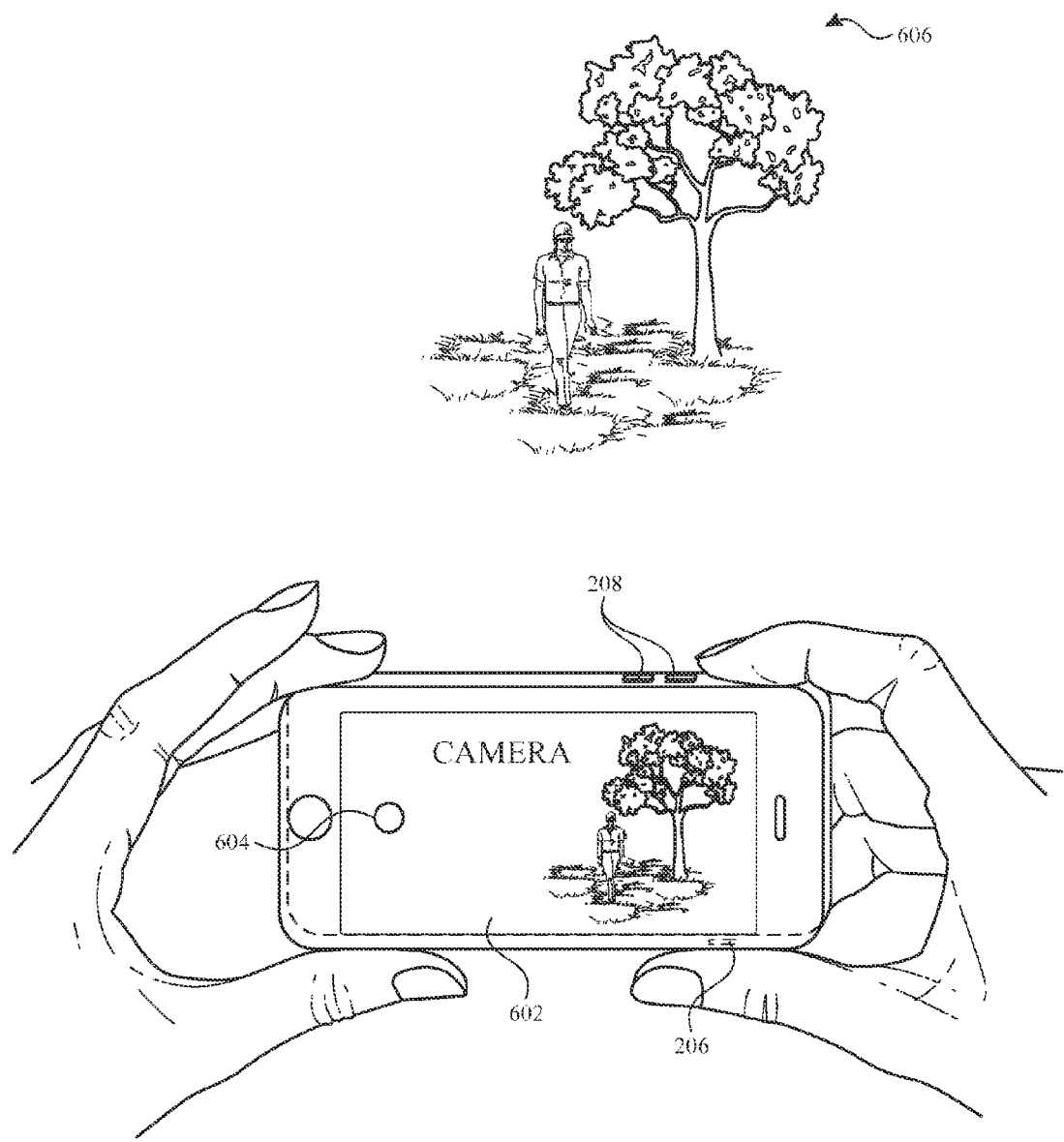
Figure 6D:
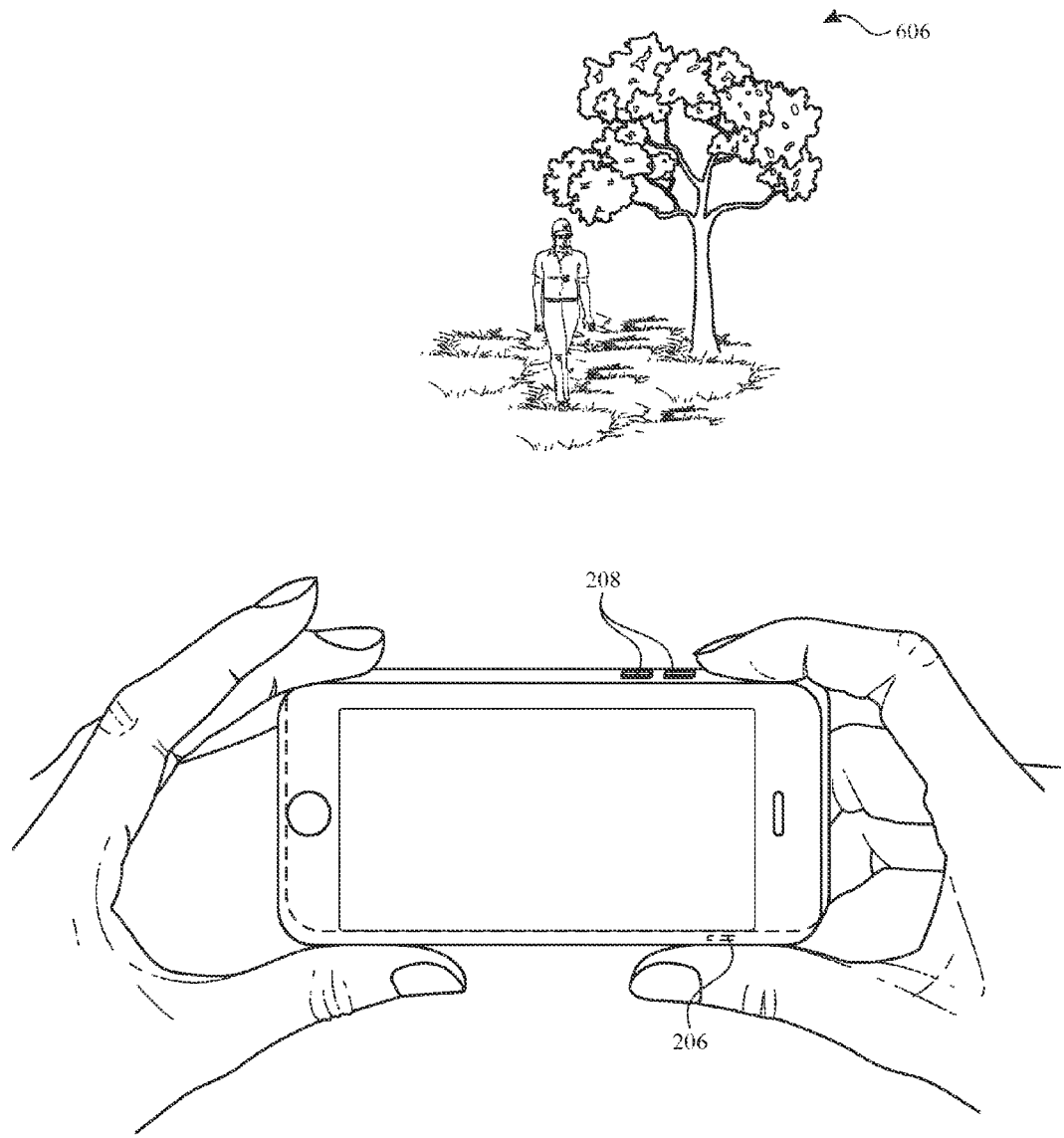

FIGS. 6C-6D illustrate an exemplary technique for turning off the display. In this example, as illustrated in FIG. 6A, the display of the device 100 is on (e.g., the display is actively displaying content) and a camera application is active. The user interface of the camera application is displaying a viewfinder 602 that includes one or more images of the scene 606 sensed by the image sensor.

The device detects, while the display is on, activation of the physical button (e.g., 206; a mechanical button or a capacitive button). In response to detecting activation of the physical button (e.g., 206), the device determines whether a set of one or more criteria is met. In this example, the set of one or more criteria include (1) a criterion that is met when the camera application is active and (2) a criterion that is met when the device is in landscape mode with the physical button on top. In FIG. 6C, for example, (1) the camera application of the device is active, but (2) the device is in landscape mode with the physical button (e.g., 206) on the bottom. Thus, the device 100 in FIG. 6A determines that the set of one or more criteria is not met.

In response to detecting activation of the physical button (e.g., 206) and in accordance with a determination that the set of one or more criteria is not met, the device turns the display off, as illustrated in FIG. 6D. In some examples, alternative to or in addition to turning the display off, the device locks the electronic device. Accordingly, the physical button (e.g., 206) is a multifunction button which, when activated, causes the device to perform a different action based on a determination of whether the set of one or more criteria is met.

Figure 6E:
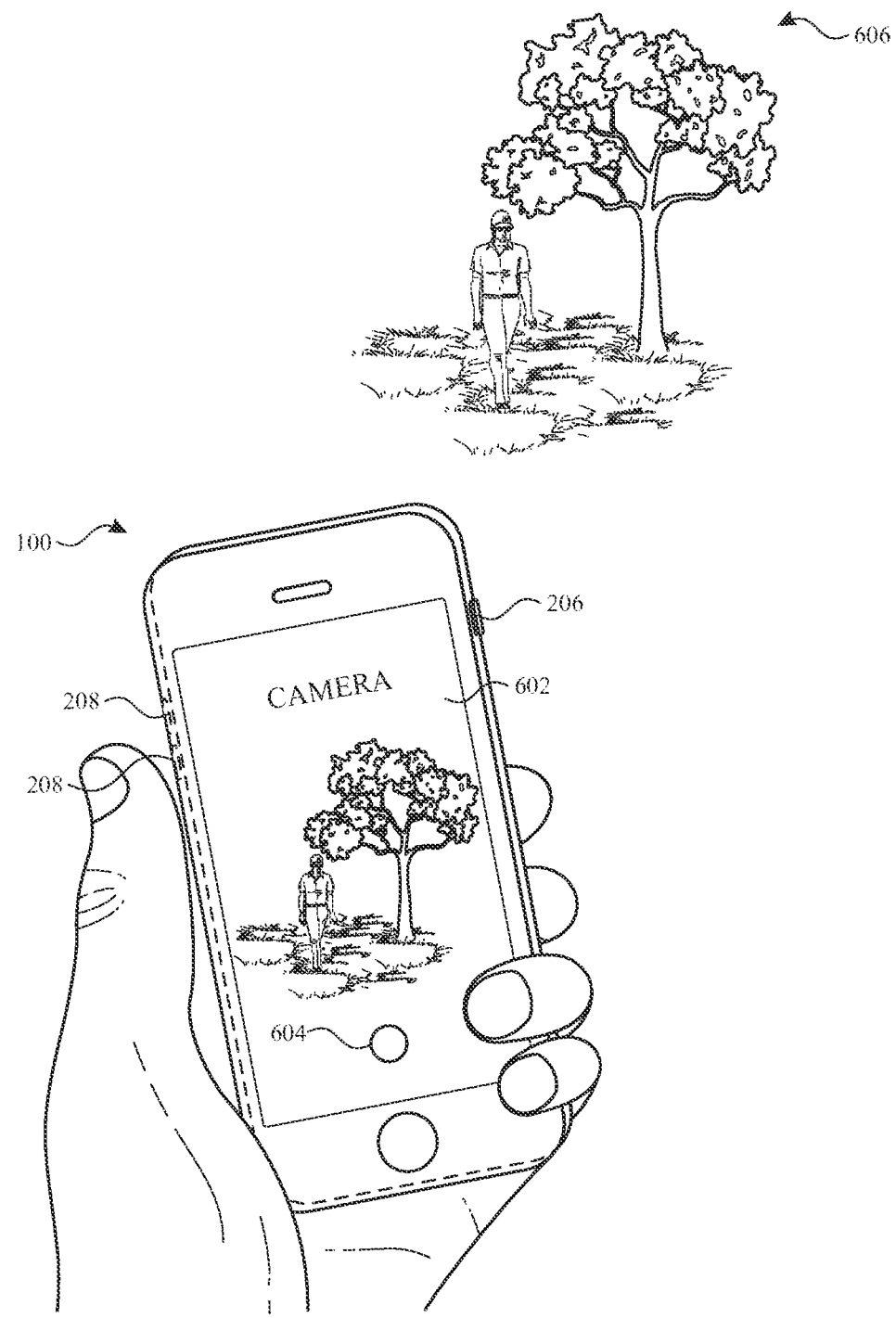

As illustrated in FIGS. 6A, 6C, and 6E, the device optionally displays affordance 604. The device detects activation of affordance 604. In response to detecting activation of affordance 604, the device captures an image (e.g., regardless of whether the set of one or more criteria are met). Thus, in some examples, the device provides several concurrent methods for receiving user input to capture an image. For example, affordance 604 is displayed independent of whether the set of one or more criteria are met. In FIGS. 6A, 6C, and 6E, affordance 604 is displayed concurrently with a viewfinder (e.g., 602) that includes one or more images sensed by the image sensor.

FIG. 7 illustrates exemplary axes of rotation for electronic device 100. Axis 702 illustrates an exemplary roll axis of device 100. Axis 704 illustrates an exemplary yaw axis of device 100. Axis 706 illustrates an exemplary pitch axis of device 100. For example, device determines, using one or more accelerometers 168, one or more of a roll, a yaw, and a pitch of the device. The roll, yaw, and pitch of the device describe the orientation of the device in three-dimensional space. In some embodiments, other measurements or determinations describe the orientation of the device in three-dimensional space.

In some embodiments, the set of one or more criteria includes one or more criterion that are based on one or more of a roll (e.g., using a current roll value), a yaw (e.g., using a current yaw value), and a pitch (e.g., using a current pitch value) of the device. For example, to determine whether the set of one or more criteria is met, the device determines one or more of: a current roll, a current yaw, and a current pitch of the device using one or more accelerometers 168. In some embodiments, the device determines at least a portion of the orientation of the device. Based on the at least a portion of the orientation of the device, the device determines if the set of one or more criteria is met. For example, when the device determines that the device is oriented (e.g., being held by a user) such that an edge of the device with the physical button (e.g., 206) is higher than a second edge of the device with the second physical button (e.g., 208), the set of one or more criteria is met and the physical button (e.g., 206) is enabled as a shutter button.

In some embodiments, the one or more criterion are based on two or more of the roll, the yaw, and the pitch of the device. For example, to determine whether the set of one or more criteria is met, the device determines two or more of: a roll, a yaw, and a pitch of the device using one or more accelerometers 168. In some embodiments, the device determines at least a portion of the orientation of the device. Based on the at least a portion of the orientation of the device, the device determines if the set of one or more criteria is met. For example, when the device determines that the device is oriented (e.g., being held by a user) such that an edge of the device with the physical button (e.g., 206) is higher than a second edge of the device with the second physical button (e.g., 208), the set of one or more criteria is met and the physical button (e.g., 206) is enabled as a shutter button.

In some embodiments, the one or more criterion are based on the roll, the yaw, and the pitch of the device. For example, to determine whether the set of one or more criteria is met, the device determines a roll, a yaw, and a pitch of the device using one or more accelerometers 168. In some embodiments, the device determines the orientation of the device. Based on the orientation of the device, the device determines if the set of one or more criteria is met. For example, when the device determines that the device is oriented (e.g., being held by a user) such that the physical button (e.g., 206) on a first edge of the device is higher than a second physical button (e.g., 208) on a second edge of the device, the set of one or more criteria is met and the physical button (e.g., 206) is enabled as a shutter button (e.g., to capture images).

In some embodiments, the set of one or more criteria includes a camera-active criterion that is met when a camera application of the device is active. For example, the camera-active criterion is met when a camera application of the device is active (e.g., displayed on the display, as illustrated in FIGS. 6A-6C). In some examples, the user interface of the camera application includes a viewfinder including images sensed by an image sensor of the electronic device (as illustrated in FIGS. 6A and 6C). In some examples, the user interface of the camera application includes a viewfinder including images sensed by an image sensor of a second electronic device, such as when the electronic device is being used as a remote control to capture images sensed the second electronic device. Thus, for example, in response to detecting activation of the physical button (e.g., 206) and in accordance with a determination that the camera application is not active, the device turns off the display of the device (e.g., when the display is on); in response to detecting activation of the physical button (e.g., 206) and in accordance with a determination that the camera application is active, the device captures an image.

In some embodiments, the set of one or more criteria includes a camera-active criterion that is met when a camera application of the device is active and a viewfinder criterion that is met when a user interface of the camera application is displaying a viewfinder that includes one or more images sensed by the image sensor. For example, the camera-active criterion is met when a camera application of the device is active (e.g., displayed on the display, as illustrated in FIGS. 6A-6C). For example, the viewfinder criterion is met when the user interface of the camera application includes a viewfinder including images sensed by the image sensor of the electronic device (as illustrated in FIGS. 6A and 6C). In some embodiments, the viewfinder criterion is met when the user interface of the camera application includes a viewfinder including images sensed by an image sensor of a second electronic device, such as when the electronic device is being used as a remote control to capture images sensed the second electronic device. Thus, for example, in response to detecting activation of the physical button (e.g., 206) and in accordance with a determination that the camera application is not active, the device turns off the display of the device (e.g., when the display is on); in response to detecting activation of the physical button (e.g., 206) and in accordance with a determination that the camera application is active and that a viewfinder is being displayed, the device captures an image.

In some embodiments, the set of one or more criteria includes a camera-active criterion that is met when a camera application of the device is active and a landscape criterion that is met when the device is in a landscape mode (as compared to a portrait mode) for at least a predetermined period of time. For example, the camera-active criterion is met when a camera application of the device is active (e.g., displayed on the display, as illustrated in FIGS. 6A-6C). For example, the device is in a landscape mode when information is displayed on the display in a landscape view based on an analysis of data received from the one or more accelerometers, as illustrated in FIGS. 6A-6C. In some examples, the device is in a portrait mode (different from the landscape mode) when information is displayed on the display in a portrait view based on an analysis of data received from the one or more accelerometers, as illustrated in FIG. 6E.

In some embodiments, the electronic device includes a second physical button (e.g., 208, different from the physical button 206) and the set of one or more criteria includes a camera-active criterion that is met when a camera application of the device is active (e.g., a user interface of the camera application is displayed on the display) and a landscape-with-button-up criterion that is met when the device is in a landscape mode (as compared to a portrait mode) with the device oriented such that the physical button (e.g., the multifunction button) is spatially higher in altitude than the second physical button. For example, in FIG. 6A the device is in a landscape mode and the device is oriented such that the physical button (e.g., 206) is spatially higher in altitude than the second physical button (e.g., 208). Thus, the landscape-with-button-up criterion is met. For another example, in FIG. 6C the device is in a landscape mode, but the device is oriented such that the physical button (e.g., 206) is not spatially higher in altitude than the second physical button (e.g., 208). Thus, the landscape-with-button-up criterion is not met.

In some embodiments, while the set of one or more criteria is met, the device detects (e.g., while the display is on) activation of the second physical button (e.g., 208; a mechanical button or a capacitive button; a volume up button or a volume down button). In response to detecting activation of the second physical button (e.g., 208), the device captures a second image using the image sensor. Thus, in response to detecting activation of the second button, the device captures one or more images. Accordingly, the set of one or more criteria is not met when the device is oriented such that the physical button (or a portion of the physical button) is not spatially higher in altitude than the second physical button (e.g., a volume button).

In some examples, the device enters a landscape mode when the device detects that the device is within a first range of orientations. For example, the range of orientations is based on a range of roll, yaw, and pitch. In some examples, the device displays at least a portion of the user interface on the display in an orientation that accommodates usage of the device while the device is oriented in a landscape orientation (e.g., a landscape view). In some examples, the device exits the landscape mode and enters a portrait mode when the device detects that the device is within a second range of orientations. In some examples, the second range of orientations excludes the first range of orientations.

In some examples, the device determines the orientation of the device using an inertial sensor, an accelerometer 168, and/or a magnetometer.

In some embodiments, the device includes an orientation sensor (e.g., an accelerometer 168) to determine that the device is in landscape mode with the device oriented such that the physical button is spatially higher in altitude than the second physical button. For example, the device detects, using the orientation sensor, a yaw of the device and the device detects a roll of the device. The device determines that the yaw of the device exceeds a predetermined yaw threshold (and, optionally, that the yaw of the device does not exceed a second predetermined yaw threshold). The device also determines that the roll of the device exceeds a predetermined roll threshold (and, optionally, that the roll of the device does not exceed a second predetermined roll threshold). In accordance with a determination that the yaw of the device exceeds the predetermined yaw threshold and that the roll of the device exceeds the predetermined roll threshold, the device determines that the device is in landscape mode. In some examples, determining that the device is oriented such that the physical button is spatially higher in altitude than the second button also includes detecting a pitch of the device and determining that the pitch of the device exceeds a predetermined pitch threshold (and, optionally, that the pitch of the device does not exceed a second predetermined pitch threshold).

In some embodiments, the electronic device includes a second physical button (e.g., 208; different from the physical button 206). While a camera application of the device is active (e.g., a user interface of the camera application is displayed on the display), the device detects activation of the second physical button (e.g., 208; a mechanical button or a capacitive button; a volume up button or a volume down button). While a camera application of the device is active and in response to detecting activation of the second physical button (e.g., 208), the device captures an image using the image sensor. For example, when the camera application is active (e.g., when the user interface of the camera application is displayed on the display or when a viewfinder of the camera application is displayed on the display), the device captures an image in response to detecting activation of the second physical button (e.g., 208). In some examples, the device captures the image in response to detecting activation of the second physical button (e.g., 208) regardless of whether the set of one or more criteria are met. Thus, when the set of one or more criteria is met, activation of the physical button (e.g., 206) and activation of second physical button (e.g., 208) cause the device to capture an image using the image sensor.

In some embodiments, the device includes a proximity sensor (e.g., 166). The set of one or more criteria includes a proximity criterion that is met when the device detects, via the proximity sensor (e.g., 166), a distance to an object that is greater than a predetermined distance. For example, the set of one or more criteria is not met when the device is in the pocket of the user.

In some embodiments, the device includes an ambient light sensor. The set of one or more criteria includes an ambient-light criterion that is met when the device detects, via the ambient light sensor, ambient light that is greater than a predetermined light threshold. For example, the set of one or more criteria is not met when the device is in the pocket of the user that blocks ambient light.

In some embodiments, the set of one or more criteria includes a face-recognition criterion that is met when the device detects, via the image sensor, at least a portion of a face (e.g., a face of a person in scene 606) within a field of view of the image sensor. For example, the device detects a human face in the field of view of the image sensor when the user is about to take a picture of themselves (e.g., a selfie) or of another person.

In some embodiments, the electronic device includes a second physical button (e.g., 208; different from the physical button 206) and the set of one or more criteria includes a second-button-activated criterion that is met when the device detects activation of the second physical button (e.g., 208) within a predetermined period of time of detecting activation of the physical button. Thus, if the device detects activation of the physical button (e.g., 208) within a predetermined period of time (e.g., 30 ms before or after) of detecting activation of the second physical button (e.g., 208; a volume up or volume down button), the second-button-activated criterion is met. If the set of one or more criteria is met, the device captures an image using the image sensor and, optionally, does not turn off the display or lock the device. For example, a user may intend to activate the second physical button (e.g., a button that is functioning as a shutter-release) but also unintentionally activates the physical button (e.g., 208) within a predetermined period of time (e.g., just prior to activating the second physical button).

In some embodiments, in accordance with the determination that the set of one or more criteria is met, the electronic device displays, on the display, a visual indication (e.g., 610) that activating the physical button will capture an image using the image sensor. For example, FIG. 6A illustrates an exemplary visual indication (e.g., 610). In some examples, the visual indication (e.g., 610) is displayed adjacent to the physical button (e.g., 206). In some examples, the visual indication includes text, such as "shutter." In some embodiments, in accordance with the determination that the set of one or more criteria is not met, the device forgoes displaying, on the display, the visual indication (e.g., 610), as illustrated in FIG. 6C.

In some embodiments, in accordance with the determination that the set of one or more criteria is not met, the electronic device locks the electronic device.

Generally, the electronic device 100 can be in a lock state and an unlock state. When the device is in the lock state, the device is said to be locked. When the device is in the unlock state, the device is said to be unlocked. Locking the device refers to transitioning the device from the unlock state to the lock state. Unlocking the device refers to transitioning the device from the lock state to the unlock state.

In the lock state, the electronic device 100 is powered on and operational but is prevented from performing a predefined set of operations in response to user input. For example, the predefined set of operations includes navigation between user interfaces, activation or deactivation of a predefined set of functions, and activation or deactivation of certain applications. For example, the lock state is used to prevent unintentional or unauthorized use of some functionality of the electronic device or activation or deactivation of some functions on the electronic device.

In the unlock state, the electronic device 100 is power on and operational and is not prevented from performing at least a portion of the predefined set of operations that cannot be performed while in the lock state. In some embodiments, when device 100 is in the lock state, the device 100 responds to a limited set of user inputs, including inputs that correspond to transitioning the device 100 to a user interface for unlocking the device 100 or inputs that correspond to powering the device 100 off.

In some embodiments, detecting activation of the physical button (e.g., 206) includes detecting depression of the physical button for less than a predetermined period of time. In some examples, detecting activation of the physical button includes detecting a touch on the physical button (e.g., 206) for less than the predetermined period of time.

In some embodiments, detecting activation of the physical button (e.g., 206) includes one or more of: (1) detecting that the physical button is depressed (e.g., detecting that the user is depressing the button); (2) detecting that the physical button has transitioned to a depressed state (e.g., "on press"; detecting that the user depresses the button); (3) detecting that the physical button is depressed for less than a predetermined period of time (e.g., detecting that the user depresses the button for a period of time that does not exceed a threshold period of time); (4) detecting that the physical button is depressed for more than a predetermined period of time (e.g., detecting that the user depresses the button for a period of time that exceeds a threshold period of time); (5) detecting that the physical button has transitioned to a non-depressed state (e.g., "lift off"; detecting that the user is no longer depressing the physical button); (6) detecting that the physical button has transitioned from a first state to a second state different from the first state; (7) detecting a touch on the physical button (e.g., detecting that a user places a finger on the physical button; for more than a predetermined period of time; for less than a predetermined period of time); and (8) detecting removal of a touch on the physical button (e.g., detecting that a user removes a finger from the physical button; after a touch for more than a predetermined period of time; after a touch for less than a predetermined period of time).

FIG. 8 illustrates an exemplary user interface for turning electronic device 100 off. In some embodiments, the device displays a turn-device-off user interface (and, optionally, does not capture an image) when the device detects long activation of the physical button (e.g., 206), regardless of whether the set of one or more conditions is met. In some embodiments, the device detects long activation of the physical button (e.g., 206), wherein detecting long activation of the physical button (e.g., 206) includes detecting depression of the physical button (e.g., 206) for more than the predetermined period of time. In some examples, detecting long activation of the physical button includes detecting a touch on the physical button for more than the predetermined period of time. In response to detecting long activation of the physical button, the device displays, on the display, a turn-device-off user interface (e.g., 802). While displaying the turn-device-off user interface (e.g., 802), the device receives user input corresponding to a request to turn the electronic device off (e.g., receiving a swipe input on a touch-sensitive surface that transitions affordance 804 from a first position to a second position different from the first position). In response to receiving the user input corresponding to the request to turn the electronic device off, the device turns the device off. Thus, the device performs different functions in response to detecting short activation and long activation of the physical button (e.g., 206). In some examples, the device detects activation of cancel affordance 806 while the turn-device-off user interface (e.g., 802) is displayed on the display. In response to detecting activation of cancel affordance 806, the device returns to a previous displayed user interface (e.g., the user interface of the camera application).

In some embodiments, the electronic device includes a second physical button (e.g., 208; different from the physical button 206). The device detects activation of the second physical button at a first time. The device determines whether activation of the physical button (e.g., 206) is detected within a predetermined period of time of the first time (e.g., within 20 ms before or after detecting activation of the second physical button 208). In accordance with a determination that activation of the physical button (e.g., 206) is detected not within the predetermined period of time of the first time, the device captures a second image using the image sensor (e.g., storing the second image on a memory of the electronic device). In accordance with a determination that activation of the physical button (e.g., 206) is detected within the predetermined period of time of the first time, the device forgoes capturing the second image using the image sensor (e.g., forgoing storing the second image on a memory of the electronic device).

In some embodiments, and as illustrated in FIGS. 6A-6E, 7, and 8, the physical button (e.g., 206) and the second physical button (e.g., 208) are positioned on opposite edges of electronic device 100. For example, positioning the physical button (e.g., 206) on an opposite edge of device 100 from the second physical button (e.g., 208) allows users to more easily differentiate between the buttons, which reduces the amount of unintended or unnecessary user inputs the device receives.

In accordance with some embodiments, capturing an image includes capturing a still image, such as a JPEG image. In accordance with some embodiments, capturing an image includes capturing a video, such as an H.264 video. In some embodiments, capturing an image includes starting recording of a video, such as an H.264 video. The device subsequently detects, while the display is on, a second activation of the physical button (e.g., 206; a mechanical button or a capacitive button). In response to detecting activation of the physical button (e.g., 206): the device determines whether the set of one or more criteria is met (e.g., whether a camera application is active and the device is in landscape mode with power button on top); in accordance with a determination that the set of one or more criteria is met, the device stops recording the video (e.g., and stores the video on a memory of the electronic device); and in accordance with a determination that the set of one or more criteria is not met, the device turns the display off (or, alternatively or in addition, locks the electronic device).

In some embodiments, while capturing video the device detects a second activation of the physical button (e.g., 206). In response to detecting the second activation of the physical button (e.g., regardless of whether the set of one or more criteria is met), the device stops recording the video (e.g., and stores the video on a memory of the electronic device).

FIG. 9 is a flow diagram illustrating a method for managing a multifunction physical button using an electronic device in accordance with some embodiments. Method 900 is performed at a device (e.g., 100, 300, 500) with a display, a physical button (e.g., a multifunction button), and an image sensor (e.g., an optical sensor 164, a CCD sensor, a CMOS sensor). Some operations in method 900 are, optionally, combined; the order of some operations is, optionally, changed, and some operations are, optionally, omitted.

As described below, method 900 provides an intuitive way for managing a multifunction physical button. The method reduces the cognitive burden on a user for using the multifunction physical button, thereby creating a more efficient human-machine interface. For battery-operated computing devices, managing a multifunction physical button faster and more efficiently conserves power and increases the time between battery charges.

At block 902, the electronic device 100 detects, while the display is on, activation of the physical button (e.g., 206; a mechanical button or a capacitive button). In some embodiments, as described above, detecting activation of the physical button includes detecting one or more of various interactions with the physical button.

At block 904, in response to detecting activation of the physical button (e.g., 206) the process proceeds to block 906. At block 906, the electronic device determines whether a set of one or more criteria is met.

At block 908, in accordance with a determination that the set of one or more criteria is met, the electronic device captures an image using the image sensor (e.g., storing the image on a memory of the electronic device).

At block 910, in accordance with a determination that the set of one or more criteria is not met, the electronic device turns the display off (or alternatively or in addition, locking the electronic device).

At block 912, in some embodiments, the set of one or more criteria includes one or more criterion that are based on one or more of a roll (e.g., using a current roll value), a yaw (e.g., using a current yaw value), and a pitch (e.g., using a current pitch value) of the device. For example, to determine whether the set of one or more criteria is met, the device determines one or more of: a current roll, a current yaw, and a current pitch of the device using one or more accelerometers 168. In some embodiments, the device determines at least a portion of the orientation of the device. Based on the at least a portion of the orientation of the device, the device determines if the set of one or more criteria is met. For example, when the device determines that the device is oriented (e.g., being held by a user) such that an edge of the device with the physical button (e.g., 206) is higher than a second edge of the device with the second physical button (e.g., 208), the set of one or more criteria is met and the physical button (e.g., 206) is enabled as a shutter button.

In some embodiments, the one or more criterion are based on two or more of the roll, the yaw, and the pitch of the device. For example, to determine whether the set of one or more criteria is met, the device determines two or more of: a roll, a yaw, and a pitch of the device using one or more accelerometers 168. In some embodiments, the device determines at least a portion of the orientation of the device. Based on the at least a portion of the orientation of the device, the device determines if the set of one or more criteria is met. For example, when the device determines that the device is oriented (e.g., being held by a user) such that an edge of the device with the physical button (e.g., 206) is higher than a second edge of the device with the second physical button (e.g., 208), the set of one or more criteria is met and the physical button (e.g., 206) is enabled as a shutter button.

In some embodiments, the one or more criterion are based on the roll, the yaw, and the pitch of the device. For example, to determine whether the set of one or more criteria is met, the device determines a roll, a yaw, and a pitch of the device using one or more accelerometers 168. In some embodiments, the device determines the orientation of the device. Based on the orientation of the device, the device determines if the set of one or more criteria is met. For example, when the device determines that the device is oriented (e.g., being held by a user) such that the physical button (e.g., 206) on a first edge of the device is higher than a second physical button (e.g., 208) on a second edge of the device, the set of one or more criteria is met and the physical button (e.g., 206) is enabled as a shutter button (e.g., to capture images).

At block 914, in some embodiments, the set of one or more criteria includes a camera-active criterion that is met when a camera application of the device is active. For example, the camera-active criterion is met when a camera application of the device is active (e.g., displayed on the display, as illustrated in FIGS. 6A-6C). In some examples, the user interface of the camera application includes a viewfinder including images sensed by an image sensor of the electronic device (as illustrated in FIGS. 6A and 6C). In some examples, the user interface of the camera application includes a viewfinder including images sensed by an image sensor of a second electronic device, such as when the electronic device is being used as a remote control to capture images sensed the second electronic device. Thus, for example, in response to detecting activation of the physical button (e.g., 206) and in accordance with a determination that the camera application is not active, the device turns off the display of the device (e.g., when the display is on); in response to detecting activation of the physical button (e.g., 206) and in accordance with a determination that the camera application is active, the device captures an image.

At block 916, in some embodiments, the set of one or more criteria includes a camera-active criterion that is met when a camera application of the device is active and a viewfinder criterion that is met when a user interface of the camera application is displaying a viewfinder that includes one or more images sensed by the image sensor. For example, the camera-active criterion is met when a camera application of the device is active (e.g., displayed on the display, as illustrated in FIGS. 6A-6C). For example, the viewfinder criterion is met when the user interface of the camera application includes a viewfinder including images sensed by the image sensor of the electronic device (as illustrated in FIGS. 6A and 6C). In some embodiments, the viewfinder criterion is met when the user interface of the camera application includes a viewfinder including images sensed by an image sensor of a second electronic device, such as when the electronic device is being used as a remote control to capture images sensed the second electronic device. Thus, for example, in response to detecting activation of the physical button (e.g., 206) and in accordance with a determination that the camera application is not active, the device turns off the display of the device (e.g., when the display is on); in response to detecting activation of the physical button (e.g., 206) and in accordance with a determination that the camera application is active and that a viewfinder is being displayed, the device captures an image.

At block 918, in some embodiments, the set of one or more criteria includes a camera-active criterion that is met when a camera application of the device is active and a landscape criterion that is met when the device is in a landscape mode (as compared to a portrait mode) for at least a predetermined period of time. For example, the camera-active criterion is met when a camera application of the device is active (e.g., displayed on the display, as illustrated in FIGS. 6A-6C). For example, the device is in a landscape mode when information is displayed on the display in a landscape view based on an analysis of data received from the one or more accelerometers, as illustrated in FIGS. 6A-6C. In some examples, the device is in a portrait mode (different from the landscape mode) when information is displayed on the display in a portrait view based on an analysis of data received from the one or more accelerometers, as illustrated in FIG. 6E.

In some embodiments, the electronic device includes a second physical button (e.g., 208, different from the physical button 206) and the set of one or more criteria includes a camera-active criterion that is met when a camera application of the device is active (e.g., a user interface of the camera application is displayed on the display) and a landscape-with-button-up criterion that is met when the device is in a landscape mode (as compared to a portrait mode) with the device oriented such that the physical button (e.g., the multifunction button) is spatially higher in altitude than the second physical button.

In some embodiments, while the set of one or more criteria is met, the device detects (e.g., while the display is on) activation of the second physical button (e.g., 208; a mechanical button or a capacitive button; a volume up button or a volume down button). In response to detecting activation of the second physical button (e.g., 208), the device captures a second image using the image sensor. Thus, in response to detecting activation of the second button, the device captures one or more images. Accordingly, the set of one or more criteria is not met when the device is oriented such that the physical button (or a portion of the physical button) is not spatially higher in altitude than the second physical button (e.g., a volume button).

In some examples, the device enters a landscape mode when the device detects that the device is within a first range of orientations. For example, the range of orientations is based on a range of roll, yaw, and pitch. In some examples, the device displays at least a portion of the user interface on the display in an orientation that accommodates usage of the device while the device is oriented in a landscape orientation (e.g., a landscape view). In some examples, the device exits the landscape mode and enters a portrait mode when the device detects that the device is within a second range of orientations. In some examples, the second range of orientations excludes the first range of orientations.

In some examples, the device determines the orientation of the device using an inertial sensor, an accelerometer 168, and/or a magnetometer.

In some embodiments, the device includes an orientation sensor (e.g., an accelerometer 168). To determine that the device is in landscape mode with the device oriented such that the physical button is spatially higher in altitude than the second physical button, the device detects, using the orientation sensor, a yaw of the device and the device detects a roll of the device. The device determines that the yaw of the device exceeds a predetermined yaw threshold (and, optionally, that the yaw of the device does not exceed a second predetermined yaw threshold). The device also determines that the roll of the device exceeds a predetermined roll threshold (and, optionally, that the roll of the device does not exceed a second predetermined roll threshold). In accordance with a determination that the yaw of the device exceeds the predetermined yaw threshold and that the roll of the device exceeds the predetermined roll threshold, the device determines that the device is in landscape mode. In some examples, determining that the device is oriented such that the physical button is spatially higher in altitude than the second button also includes detecting a pitch of the device and determining that the pitch of the device exceeds a predetermined pitch threshold (and, optionally, that the pitch of the device does not exceed a second predetermined pitch threshold).

In some embodiments, the electronic device includes a second physical button (e.g., 208; different from the physical button 206). While a camera application of the device is active (e.g., a user interface of the camera application is displayed on the display), the device detects activation of the second physical button (e.g., 208; a mechanical button or a capacitive button; a volume up button or a volume down button). While a camera application of the device is active and in response to detecting activation of the second physical button (e.g., 208), the device captures an image using the image sensor. For example, when the camera application is active (e.g., when the user interface of the camera application is displayed on the display or when a viewfinder of the camera application is displayed on the display), the device captures an image in response to detecting activation of the second physical button (e.g., 208). In some examples, the device captures the image in response to detecting activation of the second physical button (e.g., 208) regardless of whether the set of one or more criteria are met. Thus, when the set of one or more criteria is met, activation of the physical button (e.g., 206) and activation of second physical button (e.g., 208) cause the device to capture an image using the image sensor.

In some embodiments, the device includes a proximity sensor (e.g., 166). The set of one or more criteria includes a proximity criterion that is met when the device detects, via the proximity sensor (e.g., 166), a distance to an object that is greater than a predetermined distance. For example, the set of one or more criteria is not met when the device is in the pocket of the user.

In some embodiments, the device includes an ambient light sensor. The set of one or more criteria includes an ambient-light criterion that is met when the device detects, via the ambient light sensor, ambient light that is greater than a predetermined light threshold. For example, the set of one or more criteria is not met when the device is in the pocket of the user that blocks ambient light.

In some embodiments, the set of one or more criteria includes a face-recognition criterion that is met when the device detects, via the image sensor, at least a portion of a face (e.g., a face of a person in scene 606) within a field of view of the image sensor. For example, the device detects a human face in the field of view of the image sensor when the user is about to take a picture of themselves (e.g., a selfie) or of another person.

In some embodiments, the electronic device includes a second physical button (e.g., 208; different from the physical button 206) and the set of one or more criteria includes a second-button-activated criterion that is met when the device detects activation of the second physical button (e.g., 208) within a predetermined period of time of detecting activation of the physical button. Thus, if the device detects activation of the physical button (e.g., 208) within a predetermined period of time (e.g., 30 ms before or after) of detecting activation of the second physical button (e.g., 208; a volume up or volume down button), the second-button-activated criterion is met. If the set of one or more criteria is met, the device captures an image using the image sensor and, optionally, does not turn off the display or lock the device.

In some embodiments, in accordance with the determination that the set of one or more criteria is met, the electronic device displays, on the display, a visual indication (e.g., 610) that activating the physical button will capture an image using the image sensor. In some examples, the visual indication (e.g., 610) is displayed adjacent to the physical button (e.g., 206). In some examples, the visual indication includes text, such as "shutter." In some embodiments, in accordance with the determination that the set of one or more criteria is not met, the device forgoes displaying, on the display, the visual indication (e.g., 610).

In some embodiments, in accordance with the determination that the set of one or more criteria is not met, the electronic device locks the electronic device.

In some embodiments, detecting activation of the physical button (e.g., 206) includes detecting depression of the physical button for less than a predetermined period of time. In some examples, detecting activation of the physical button includes detecting a touch on the physical button (e.g., 206) for less than the predetermined period of time.

In some embodiments, detecting activation of the physical button (e.g., 206) includes one or more of: (1) detecting that the physical button is depressed (e.g., detecting that the user is depressing the button); (2) detecting that the physical button has transitioned to a depressed state (e.g., "on press"; detecting that the user depresses the button); (3) detecting that the physical button is depressed for less than a predetermined period of time (e.g., detecting that the user depresses the button for a period of time that does not exceed a threshold period of time); (4) detecting that the physical button is depressed for more than a predetermined period of time (e.g., detecting that the user depresses the button for a period of time that exceeds a threshold period of time); (5) detecting that the physical button has transitioned to a non-depressed state (e.g., "lift off"; detecting that the user is no longer depressing the physical button); (6) detecting that the physical button has transitioned from a first state to a second state different from the first state; (7) detecting a touch on the physical button (e.g., detecting that a user places a finger on the physical button; for more than a predetermined period of time; for less than a predetermined period of time); and (8) detecting removal of a touch on the physical button (e.g., detecting that a user removes a finger from the physical button; after a touch for more than a predetermined period of time; after a touch for less than a predetermined period of time).

In some embodiments, the device detects long activation of the physical button (e.g., 206), wherein detecting long activation of the physical button (e.g., 206) includes detecting depression of the physical button (e.g., 206) for more than the predetermined period of time. In some examples, detecting long activation of the physical button includes detecting a touch on the physical button for more than the predetermined period of time. In response to detecting long activation of the physical button, the device displays, on the display, a turn-device-off user interface (e.g., 802). While displaying the turn-device-off user interface (e.g., 802), the device receives user input corresponding to a request to turn the electronic device off (e.g., receiving a swipe input on a touch-sensitive surface that transitions affordance 804 from a first position to a second position different from the first position). In response to receiving the user input corresponding to the request to turn the electronic device off, the device turns the device off. Thus, the device performs different functions in response to detecting short activation and long activation of the physical button (e.g., 206). In some examples, the device detects activation of cancel affordance 806 while the turn-device-off user interface (e.g., 802) is displayed on the display. In response to detecting activation of cancel affordance 806, the device returns to a previous displayed user interface (e.g., the user interface of the camera application).

In some embodiments, the electronic device includes a second physical button (e.g., 208; different from the physical button 206). The device detects activation of the second physical button at a first time. The device determines whether activation of the physical button (e.g., 206) is detected within a predetermined period of time of the first time (e.g., within 20 ms before or after detecting activation of the second physical button 208). In accordance with a determination that activation of the physical button (e.g., 206) is detected not within the predetermined period of time of the first time, the device captures a second image using the image sensor (e.g., storing the second image on a memory of the electronic device). In accordance with a determination that activation of the physical button (e.g., 206) is detected within the predetermined period of time of the first time, the device forgoes capturing the second image using the image sensor (e.g., forgoing storing the second image on a memory of the electronic device).

In some embodiments, the physical button (e.g., 206) and the second physical button (e.g., 208) are positioned on opposite edges of electronic device 100. For example, positioning the physical button (e.g., 206) on an opposite edge of device 100 from the second physical button (e.g., 208) allows users to more easily differentiate between the buttons, which reduces the amount of unintended or unnecessary user inputs the device receives.

In accordance with some embodiments, capturing an image includes capturing a still image, such as a JPEG image. In accordance with some embodiments, capturing an image includes capturing a video, such as an H.264 video. In some embodiments, capturing an image includes starting recording of a video, such as an H.264 video. The device subsequently detects, while the display is on, a second activation of the physical button (e.g., 206; a mechanical button or a capacitive button). In response to detecting activation of the physical button (e.g., 206): the device determines whether the set of one or more criteria is met (e.g., whether a camera application is active and the device is in landscape mode with power button on top); in accordance with a determination that the set of one or more criteria is met, the device stops recording the video (e.g., and stores the video on a memory of the electronic device); and in accordance with a determination that the set of one or more criteria is not met, the device turns the display off (or, alternatively or in addition, locks the electronic device).

In some embodiments, while capturing video, the device detects a second activation of the physical button (e.g., 206). In response to detecting the second activation of the physical button (e.g., regardless of whether the set of one or more criteria is met), the device stops recording the video (e.g., and stores the video on a memory of the electronic device).

Figure 10:
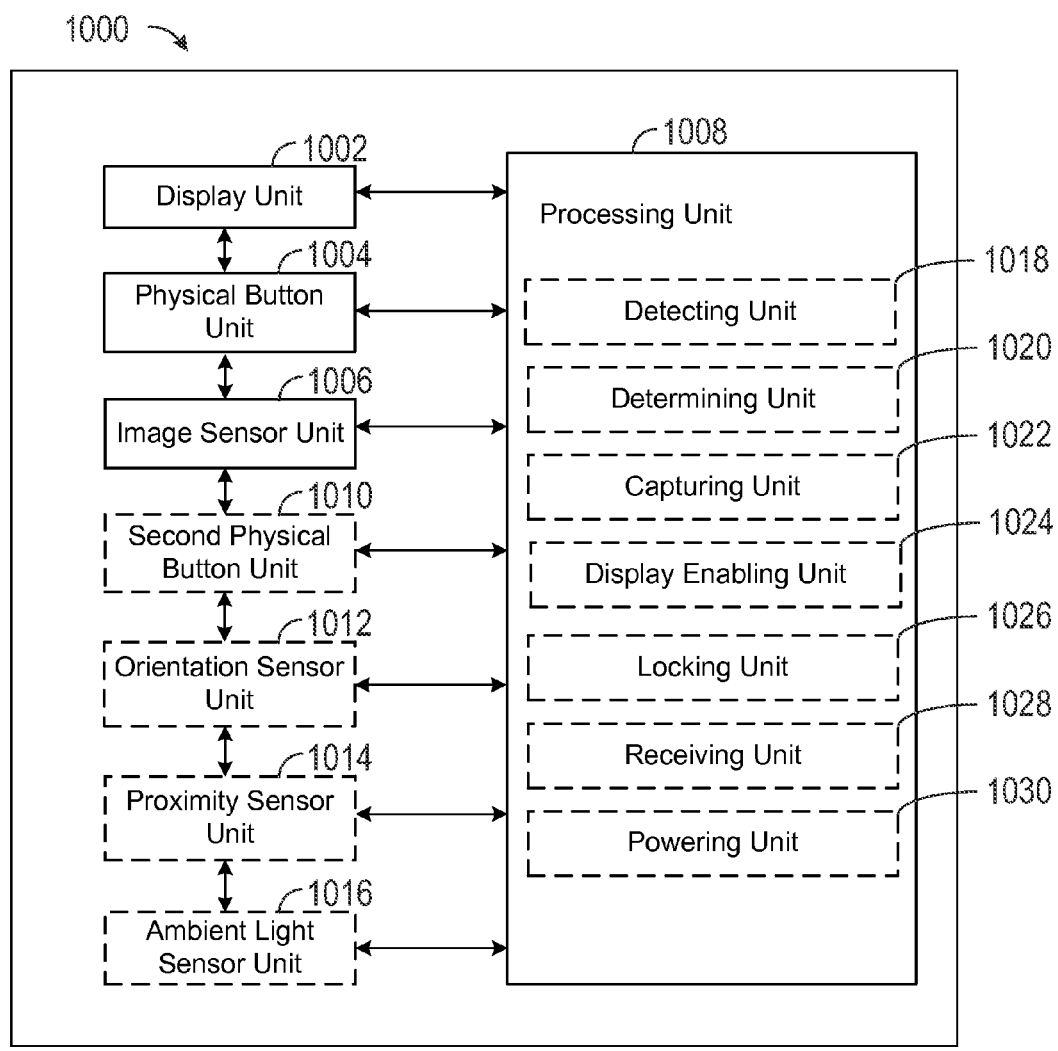
FIG. 10 is a functional block diagram of an electronic device in accordance with some embodiments.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a display unit 1002 configured to display a graphic user interface, a physical button unit 1004, an image sensor unit 1006 configured to sense images, a processing unit 1008, and, optionally, a second physical button unit 1010, an orientation sensor unit 1012, a proximity sensor unit 1014, and an ambient light sensor unit 1016. The processing unit 1008 is coupled to the display unit 1002, the physical button unit 1004, the image sensor unit 1006, and, optionally, the second physical button unit 1010, the orientation sensor unit 1012, the proximity sensor unit 1014, and the ambient light sensor unit 1016. In some embodiments, the processing unit 1008 includes a detecting unit 1018, a determining unit 1020, a capturing unit 1022, a display enabling unit 1024, a locking unit 1026, a receiving unit 1028, and a powering unit 1030.

The processing unit 1008 is configured to: detect (e.g., with detecting unit 1018), while the display unit is on, activation of the physical button unit; and in response to detecting activation of the physical button unit 1004: determine (e.g., with determining unit 1020) whether a set of one or more criteria is met; in accordance with a determination that the set of one or more criteria is met, capture (e.g., with capturing unit 1022) an image using the image sensor unit 1006; and in accordance with a determination that the set of one or more criteria is not met, turning (e.g., with display enabling unit 1024) the display unit 1002 off.

In some embodiments, the set of one or more criteria includes one or more criterion that are based on one or more of a roll, a yaw, and a pitch of the device 1000.

In some embodiments, the one or more criterion are based on two or more of the roll, the yaw, and the pitch of the device 1000.

In some embodiments, the one or more criterion are based on the roll, the yaw, and the pitch of the device 1000.

In some embodiments, the set of one or more criteria includes a camera-active criterion that is met when a camera application of the device is active.

In some embodiments, the set of one or more criteria includes a camera-active criterion that is met when a camera application of the device 1000 is active and a viewfinder criterion that is met when a user interface of the camera application is displaying a viewfinder that includes one or more images sensed by the image sensor unit 1006.

In some embodiments, the set of one or more criteria includes a camera-active criterion that is met when a camera application of the device 1000 is active and a landscape criterion that is met when the device 1000 is in a landscape mode for at least a predetermined period of time.

In some embodiments, the set of one or more criteria includes a camera-active criterion that is met when a camera application of the device is active and a landscape-with-button-up criterion that is met when the device is in a landscape mode with the device oriented such that the physical button unit 1004 is spatially higher in altitude than the second physical button unit 1010.

In some embodiments, to determine that the device is in landscape mode with the device 1000 oriented such that the physical button unit 1004 is spatially higher in altitude than the second physical button unit 1010, the processing unit 1008 is further configured to: detect (e.g., with detecting unit 1018), using the orientation sensor unit 1012, a yaw of the device 1000; detect (e.g., with detecting unit 1018), using the orientation sensor unit 1012, a roll of the device 1000; determine (e.g., with determining unit 1020) that the yaw of the device 1000 exceeds a predetermined yaw threshold; determine (e.g., with determining unit 1020) that the roll of the device 1000 exceeds a predetermined roll threshold; and in accordance with a determination that the yaw of the device 1000 exceeds the predetermined yaw threshold and that the roll of the device 1000 exceeds the predetermined roll threshold, determine (e.g., with determining unit 1020) that the device 1000 is in landscape mode.

In some embodiments, the processing unit 1008 is further configured to, while a camera application of the device 1000 is active: detect (e.g., with detecting unit 1018) activation of the second physical button unit 1010; and in response to detecting activation of the second physical button unit 1010, capture (e.g., with capturing unit 1022) a second image using the image sensor unit 1006.

In some embodiments, the set of one or more criteria includes a proximity criterion that is met when the device 1000 detects (e.g., with detecting unit 1018), via the proximity sensor unit 1014, a distance to an object that is greater than a predetermined distance.

In some embodiments, the set of one or more criteria includes an ambient-light criterion that is met when the device 1000 detects (e.g., with detecting unit 1018), via the ambient light sensor unit 1016, ambient light that is greater than a predetermined light threshold.

In some embodiments, the set of one or more criteria includes a face-recognition criterion that is met when the device 1000 detects (e.g., with detecting unit 1018), via the image sensor unit 1006, at least a portion of a face within a field of view of the image sensor unit 1006.

In some embodiments, the set of one or more criteria includes a second-button-activated criterion that is met when the device 1000 detects (e.g., with detecting unit 1018) activation of the second physical button unit 1010 within a predetermined period of time of detecting (e.g., with detecting unit 1018) activation of the physical button unit 1004.

In some embodiments, processing unit 1008 is further configured to: in accordance with the determination that the set of one or more criteria is met, enable display (e.g., with display enabling unit 1024), on the display unit 1002, a visual indication that activating the physical button unit 1004 will capture an image using the image sensor unit 1006.

In some embodiments, processing unit 1008 is further configured to: in accordance with the determination that the set of one or more criteria is not met, lock (e.g., with locking unit 1026) the electronic device 1000.

In some embodiments, to detect (e.g., with detecting unit 1018) activation of the physical button unit 1004, the processing unit 1008 is further configured to detect (e.g., with detecting unit 1018) depression of the physical button unit 1004 for less than a predetermined period of time.

In some embodiments, processing unit 1008 is further configured to: detect (e.g., with detecting unit 1018) long activation of the physical button unit 1004, wherein to detect (e.g., with detecting unit 1018) long activation of the physical button unit 1004 the processing unit 1008 is further configured to detect (e.g., with detecting unit 1018) depression of the physical button unit 1004 for more than the predetermined period of time; in response to detecting long activation of the physical button unit 1004, enable display (e.g., with display enabling unit 1024), on the display unit 1002, a turn-device-off user interface; while displaying the turn-device-off user interface, receive (e.g., with receiving unit 1028) user input corresponding to a request to turn the electronic device off; and in response to receiving the user input corresponding to the request to turn the electronic device 1000 off, turn (e.g., using powering unit 1030) the electronic device 1000 off.

In some embodiments, the processing unit 1008 is further configured to: detect (e.g., with detecting unit 1018) activation of the second physical button 1010 at a first time; determine (e.g., with determining unit 1020) whether activation of the physical button unit 1004 is detected within a predetermined period of time of the first time; in accordance with a determination that activation of the physical button unit 1004 is detected not within the predetermined period of time of the first time, capture (e.g., with capturing unit 1022) a second image using the image sensor unit 1006; and in accordance with a determination that activation of the physical button unit 1004 is detected within the predetermined period of time of the first time, forgo capturing (e.g., with capturing unit 1022) the second image using the image sensor unit 1006.

The operations described above with reference to FIG. 9 are, optionally, implemented by components depicted in FIGS. 1A-1B or FIG. 10. For example, detecting operation 902, determining operation 906, and capturing operation 908 are, optionally, implemented by event sorter 170, event recognizer 180, and event handler 190. Event monitor 171 in event sorter 170 detects activation of physical button 206, and event dispatcher module 174 delivers the event information to application 136-1. A respective event recognizer 180 of application 136-1 compares the event information to respective event definitions 186. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium comprising: one or more programs for execution by one or more processors of an electronic device with a display, a physical button, and an image sensor, the one or more programs including instructions for:
   detecting, while the display is on, activation of the physical button; and
   in response to detecting activation of the physical button:
      determining whether a set of one or more criteria is met;
      in accordance with a determination that the set of one or more criteria is met, capturing an image using the image sensor in response to detecting the activation of the physical button; and
      in accordance with a determination that the set of one or more criteria is not met, turning the display off in response to detecting the activation of the physical button instead of capturing an image in response to detecting the activation of the physical button.

2. The non-transitory computer-readable storage medium of claim 1, wherein the set of one or more criteria includes one or more criterion that are based on one or more of a roll, a yaw, and a pitch of the device.

3. The non-transitory computer-readable storage medium of claim 2, wherein the one or more criterion are based on two or more of the roll, the yaw, and the pitch of the device.

4. The non-transitory computer-readable storage medium of claim 3, wherein the one or more criterion are based on the roll, the yaw, and the pitch of the device.

5. The non-transitory computer-readable storage medium of claim 1, wherein the set of one or more criteria includes a camera-active criterion that is met when a camera application of the device is active.

6. The non-transitory computer-readable storage medium of claim 1, wherein the set of one or more criteria includes a camera-active criterion that is met when a camera application of the device is active and a viewfinder criterion that is met when a user interface of the camera application is displaying a viewfinder that includes one or more images sensed by the image sensor.

7. The non-transitory computer-readable storage medium of claim 1, wherein the set of one or more criteria includes a camera-active criterion that is met when a camera application of the device is active and a landscape criterion that is met when the device is in a landscape mode for at least a predetermined period of time.

8. The non-transitory computer-readable storage medium of claim 7, wherein the electronic device includes a second physical button, further comprising instructions for:
  detecting activation of the second physical button at a first time;
  determining whether activation of the physical button is detected within a predetermined period of time of the first time;
  in accordance with a determination that activation of the physical button is detected at a time that does not occur within the predetermined period of time of the first time, capturing a second image using the image sensor; and
  in accordance with a determination that activation of the physical button is detected within the predetermined period of time of the first time, forgoing capturing the second image using the image sensor.

9. The non-transitory computer-readable storage medium of claim 1, wherein the electronic device includes a second physical button and the set of one or more criteria includes a camera-active criterion that is met when a camera application of the device is active and a landscape-with-button-up criterion that is met when the device is in a landscape mode with the device oriented such that the physical button is spatially higher in altitude than the second physical button.

10. The non-transitory computer-readable storage medium of claim 9, wherein the device includes an orientation sensor and wherein to determine that the device is in landscape mode with the device oriented such that the physical button is spatially higher in altitude than the second physical button, further comprises instructions for:
  detecting, using the orientation sensor, a yaw of the device;
  detecting, using the orientation sensor, a roll of the device;
  determining that the yaw of the device exceeds a predetermined yaw threshold;
  determining that the roll of the device exceeds a predetermined roll threshold; and
  in accordance with a determination that the yaw of the device exceeds the predetermined yaw threshold and that the roll of the device exceeds the predetermined roll threshold, determining that the device is in landscape mode.

11. The non-transitory computer-readable storage medium of claim 1, wherein the electronic device includes a second physical button, further comprising instructions for, while a camera application of the device is active:
  detecting activation of the second physical button; and
  in response to detecting activation of the second physical button, capturing a second image using the image sensor.

12. The non-transitory computer-readable storage medium of claim 1, wherein the device includes a proximity sensor and wherein the set of one or more criteria includes a proximity criterion that is met when the device detects, via the proximity sensor, a distance to an object that is greater than a predetermined distance.

13. The non-transitory computer-readable storage medium of claim 1, wherein the device includes an ambient light sensor and wherein the set of one or more criteria includes an ambient-light criterion that is met when the device detects, via the ambient light sensor, ambient light that is greater than a predetermined light threshold.

14. The non-transitory computer-readable storage medium of claim 1, wherein the set of one or more criteria includes a face-recognition criterion that is met when the device detects, via the image sensor, at least a portion of a face within a field of view of the image sensor.

15. The non-transitory computer-readable storage medium of claim 1, wherein the electronic device includes a second physical button and the set of one or more criteria includes a second-button-activated criterion that is met when the device detects activation of the second physical button within a predetermined period of time of detecting activation of the physical button.

16. The non-transitory computer-readable storage medium of claim 1, further comprising instructions for:
  in accordance with the determination that the set of one or more criteria is met, displaying, on the display, a visual indication that activating the physical button will capture an image using the image sensor.

17. The non-transitory computer-readable storage medium of claim 1, further comprising instructions for:
  in accordance with the determination that the set of one or more criteria is not met, locking the electronic device.

18. The non-transitory computer-readable storage medium of claim 1, wherein detecting activation of the physical button includes detecting depression of the physical button for less than a predetermined period of time.

19. The non-transitory computer-readable storage medium of claim 18, further comprising instructions for:
  detecting long activation of the physical button, wherein detecting long activation of the physical button includes detecting depression of the physical button for more than the predetermined period of time;
  in response to detecting long activation of the physical button, displaying, on the display, a turn-device-off user interface;
  while displaying the turn-device-off user interface, receiving user input corresponding to a request to turn the electronic device off; and
  in response to receiving the user input corresponding to the request to turn the electronic device off, turning the electronic device off.

20. A method, comprising:
  at an electronic device with a display, a physical button, and an image sensor:
    detecting, while the display is on, activation of the physical button; and
    in response to detecting activation of the physical button:
      determining whether a set of one or more criteria is met;
      in accordance with a determination that the set of one or more criteria is met, capturing an image using the image sensor in response to detecting the activation of the physical button; and in accordance with a determination that the set of one or more criteria is not met, turning the display off in response to detecting the activation of the physical button instead of capturing an image in response to detecting the activation of the physical button.

21. The method of claim 20, wherein the set of one or more criteria includes one or more criterion that are based on one or more of a roll, a yaw, and a pitch of the device.

22. The method of claim 21, wherein the one or more criterion are based on two or more of the roll, the yaw, and the pitch of the device.

23. The method of claim 22, wherein the one or more criterion are based on the roll, the yaw, and the pitch of the device.

24. The method of claim 20, wherein the set of one or more criteria includes a camera-active criterion that is met when a camera application of the device is active.

25. The method of claim 20, wherein the set of one or more criteria includes a camera-active criterion that is met when a camera application of the device is active and a viewfinder criterion that is met when a user interface of the camera application is displaying a viewfinder that includes one or more images sensed by the image sensor.

26. The method of claim 20, wherein the set of one or more criteria includes a camera-active criterion that is met when a camera application of the device is active and a landscape criterion that is met when the device is in a landscape mode for at least a predetermined period of time.

27. The method of claim 26, wherein the electronic device includes a second physical button, the method further comprising:
    detecting activation of the second physical button at a first time;
    determining whether activation of the physical button is detected within a predetermined period of time of the first time;
    in accordance with a determination that activation of the physical button is detected at a time that does not occur within the predetermined period of time of the first time, capturing a second image using the image sensor; and
in accordance with a determination that activation of the physical button is detected within the predetermined period of time of the first time, forgoing capturing the second image using the image sensor.

28. The method of claim 20, wherein the electronic device includes a second physical button and the set of one or more criteria includes a camera-active criterion that is met when a camera application of the device is active and a landscape-with-button-up criterion that is met when the device is in a landscape mode with the device oriented such that the physical button is spatially higher in altitude than the second physical button.

29. The method of claim 28, wherein the device includes an orientation sensor and wherein to determine that the device is in landscape mode with the device oriented such that the physical button is spatially higher in altitude than the second physical button, wherein the method further comprises:
    detecting, using the orientation sensor, a yaw of the device;
    detecting, using the orientation sensor, a roll of the device;
    determining that the yaw of the device exceeds a predetermined yaw threshold;
    determining that the roll of the device exceeds a predetermined roll threshold; and
    in accordance with a determination that the yaw of the device exceeds the predetermined yaw threshold and that the roll of the device exceeds the predetermined roll threshold, determining that the device is in landscape mode.

30. The method of claim 20, wherein the electronic device includes a second physical button, the method further comprising, while a camera application of the device is active:
    detecting activation of the second physical button; and
    in response to detecting activation of the second physical button, capturing a second image using the image sensor.

31. The method of claim 20, wherein the device includes a proximity sensor and wherein the set of one or more criteria includes a proximity criterion that is met when the device detects, via the proximity sensor, a distance to an object that is greater than a predetermined distance.

32. The method of claim 20, wherein the device includes an ambient light sensor and wherein the set of one or more criteria includes an ambient-light criterion that is met when the device detects, via the ambient light sensor, ambient light that is greater than a predetermined light threshold.

33. The method of claim 20, wherein the set of one or more criteria includes a face-recognition criterion that is met when the device detects, via the image sensor, at least a portion of a face within a field of view of the image sensor.

34. The method of claim 20, wherein the electronic device includes a second physical button and the set of one or more criteria includes a second-button-activated criterion that is met when the device detects activation of the second physical button within a predetermined period of time of detecting activation of the physical button.

35. The method of claim 20, further comprising:
    in accordance with the determination that the set of one or more criteria is met, displaying, on the display, a visual indication that activating the physical button will capture an image using the image sensor.

36. The method of claim 20, further comprising:
    in accordance with the determination that the set of one or more criteria is not met, locking the electronic device.

37. The method of claim 20, wherein detecting activation of the physical button includes detecting depression of the physical button for less than a predetermined period of time.

38. The method of claim 37, further comprising:
    detecting long activation of the physical button, wherein detecting long activation of the physical button includes detecting depression of the physical button for more than the predetermined period of time;
    in response to detecting long activation of the physical button, displaying, on the display, a turn-device-off user interface;
    while displaying the turn-device-off user interface, receiving user input corresponding to a request to turn the electronic device off; and
    in response to receiving the user input corresponding to the request to turn the electronic device off, turning the electronic device off.

39. An electronic device comprising:
    a display;
    a physical button;
    an image sensor;
    one or more processors; and
    memory storing one or more programs for execution by the one or more processors, the one or more programs including instructions for:
        detecting, while the display is on, activation of the physical button; and in response to detecting activation of the physical button:
    determining whether a set of one or more criteria is met;
    in accordance with a determination that the set of one or more criteria is met, capturing an image using the image sensor in response to detecting the activation of the physical button; and
    in accordance with a determination that the set of one or more criteria is not met, turning the display off in response to detecting the activation of the physical button instead of capturing an image in response to detecting the activation of the physical button.

40. The electronic device of claim 39, wherein the set of one or more criteria includes one or more criterion that are based on one or more of a roll, a yaw, and a pitch of the device.

41. The electronic device of claim 40, wherein the one or more criterion are based on two or more of the roll, the yaw, and the pitch of the device.

42. The electronic device of claim 41, wherein the one or more criterion are based on the roll, the yaw, and the pitch of the device.

43. The electronic device of claim 39, wherein the set of one or more criteria includes a camera-active criterion that is met when a camera application of the device is active.

44. The electronic device of claim 39, wherein the set of one or more criteria includes a camera-active criterion that is met when a camera application of the device is active and a viewfinder criterion that is met when a user interface of the camera application is displaying a viewfinder that includes one or more images sensed by the image sensor.

45. The electronic device of claim 39, wherein the set of one or more criteria includes a camera-active criterion that is met when a camera application of the device is active and a landscape criterion that is met when the device is in a landscape mode for at least a predetermined period of time.

46. The electronic device of claim 45, wherein the electronic device includes a second physical button, the one or more programs further including instructions for:
    detecting activation of the second physical button at a first time;
    determining whether activation of the physical button is detected within a predetermined period of time of the first time;
    in accordance with a determination that activation of the physical button is detected at a time that does not occur within the predetermined period of time of the first time, capturing a second image using the image sensor; and
        in accordance with a determination that activation of the physical button is detected within the predetermined period of time of the first time, forgoing capturing the second image using the image sensor.

47. The electronic device of claim 39, wherein the electronic device includes a second physical button and the set of one or more criteria includes a camera-active criterion that is met when a camera application of the device is active and a landscape-with-button-up criterion that is met when the device is in a landscape mode with the device oriented such that the physical button is spatially higher in altitude than the second physical button.

48. The electronic device of claim 47, wherein the device includes an orientation sensor and wherein to determine that the device is in landscape mode with the device oriented such that the physical button is spatially higher in altitude than the second physical button, the one or more programs further including instructions for:
    detecting, using the orientation sensor, a yaw of the device;
    detecting, using the orientation sensor, a roll of the device;
    determining that the yaw of the device exceeds a predetermined yaw threshold;
    determining that the roll of the device exceeds a predetermined roll threshold; and
    in accordance with a determination that the yaw of the device exceeds the predetermined yaw threshold and that the roll of the device exceeds the predetermined roll threshold, determining that the device is in landscape mode.

49. The electronic device of claim 39, wherein the electronic device includes a second physical button, the one or more programs further including instructions for, while a camera application of the device is active:
    detecting activation of the second physical button; and
    in response to detecting activation of the second physical button, capturing a second image using the image sensor.

50. The electronic device of claim 39, wherein the device includes a proximity sensor and wherein the set of one or more criteria includes a proximity criterion that is met when the device detects, via the proximity sensor, a distance to an object that is greater than a predetermined distance.

51. The electronic device of claim 39, wherein the device includes an ambient light sensor and wherein the set of one or more criteria includes an ambient-light criterion that is met when the device detects, via the ambient light sensor, ambient light that is greater than a predetermined light threshold.

52. The electronic device of claim 39, wherein the set of one or more criteria includes a face-recognition criterion that is met when the device detects, via the image sensor, at least a portion of a face within a field of view of the image sensor.

53. The electronic device of claim 39, wherein the electronic device includes a second physical button and the set of one or more criteria includes a second-button-activated criterion that is met when the device detects activation of the second physical button within a predetermined period of time of detecting activation of the physical button.

54. The electronic device of claim 39, the one or more programs further including instructions for:
    in accordance with the determination that the set of one or more criteria is met, displaying, on the display, a visual indication that activating the physical button will capture an image using the image sensor.

55. The electronic device of claim 39, the one or more programs further including instructions for:
    in accordance with the determination that the set of one or more criteria is not met, locking the electronic device.

56. The electronic device of claim 39, wherein detecting activation of the physical button includes detecting depression of the physical button for less than a predetermined period of time.

57. The electronic device of claim 56, the one or more programs further including instructions for:
    detecting long activation of the physical button, wherein detecting long activation of the physical button includes detecting depression of the physical button for more than the predetermined period of time;
    in response to detecting long activation of the physical button, displaying, on the display, a turn-device-off user interface;

while displaying the turn-device-off user interface, receiving user input corresponding to a request to turn the electronic device off; and in response to receiving the user input corresponding to the request to turn the electronic device off, turning the electronic device off.

\* \* \* \* \*